United States Patent
Namimoto et al.

(10) Patent No.: US 10,865,314 B2
(45) Date of Patent: Dec. 15, 2020

(54) RESIN COMPOSITION FOR VIBRATION-DAMPING COATING MATERIAL, AND PRODUCTION METHOD THEREFOR

(71) Applicant: NIPPON SHOKUBAI CO., LTD., Osaka (JP)

(72) Inventors: Fuyuko Namimoto, Osaka (JP); Yukihiro Miyawaki, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 16/338,251

(22) PCT Filed: Sep. 29, 2017

(86) PCT No.: PCT/JP2017/035685
§ 371 (c)(1),
(2) Date: Mar. 29, 2019

(87) PCT Pub. No.: WO2018/062546
PCT Pub. Date: Apr. 5, 2018

(65) Prior Publication Data
US 2020/0032078 A1     Jan. 30, 2020

(30) Foreign Application Priority Data

Sep. 30, 2016  (JP) ................. 2016-193799
Sep. 30, 2016  (JP) ................. 2016-195189

(51) Int. Cl.
| | | |
|---|---|---|
| C09D 5/00 | (2006.01) |
| C09D 5/02 | (2006.01) |
| C09D 7/40 | (2018.01) |
| C09D 125/14 | (2006.01) |
| C09D 133/06 | (2006.01) |
| F16F 1/36 | (2006.01) |

(52) U.S. Cl.
CPC ............. *C09D 5/022* (2013.01); *C09D 7/70* (2018.01); *C09D 125/14* (2013.01); *C09D 133/064* (2013.01); *F16F 1/3605* (2013.01); *F16F 2224/02* (2013.01); *F16F 2226/00* (2013.01)

(58) Field of Classification Search
CPC .. C09D 5/022; C09D 7/63; C09D 7/70; C09D 125/14; C09D 133/064; C09D 5/028; C09D 5/00; C08L 33/12; F16F 2226/00; F16F 1/3605; F16F 2224/02
USPC .......................................... 523/201; 524/556
See application file for complete search history.

(56) References Cited

U.S. PATENT DOCUMENTS

| | | | |
|---|---|---|---|
| 8,877,848 B1 | 11/2014 | Wang et al. | |
| 2005/0101697 A1* | 5/2005 | Morihiro ............... | C08F 265/06 523/201 |
| 2007/0049697 A1 | 3/2007 | Miyawaki et al. | |
| 2016/0280814 A1* | 9/2016 | Nakao .................. | C09D 151/08 |

FOREIGN PATENT DOCUMENTS

| | | |
|---|---|---|
| JP | 8-231731 | 9/1996 |
| JP | 10-007872 | 1/1998 |
| JP | 10-316866 | 12/1998 |
| JP | 10-316888 | 12/1998 |
| JP | 4630534 B | 2/2001 |
| JP | 2005-105133 | 4/2005 |
| JP | 3703585 B | 10/2005 |
| JP | 5289803 B | 9/2013 |
| JP | 2014-177626 | 9/2014 |
| JP | 2015-034275 | 2/2015 |
| WO | 2007/023821 | 3/2007 |
| WO | 2007/034933 | 3/2007 |

\* cited by examiner

*Primary Examiner* — Hannah J Pak
(74) *Attorney, Agent, or Firm* — Hamre, Schumann, Mueller & Larson, P.C.

(57) ABSTRACT

The invention provides a method for providing a coat having excellent appearance and an excellent vibration damping property in a temperature range of a use environment of vibration damping materials. The invention relates to a vibration damping coating resin composition including an emulsion particle having a multilayer structure, the emulsion particle including an outermost layer and an inner layer located inside the outermost layer, the outermost layer being formed from a resin having a glass transition temperature of 60° C. or higher, the outermost layer being present in a proportion of 1% to 30% by mass in 100% by mass of the emulsion particle.

20 Claims, 1 Drawing Sheet

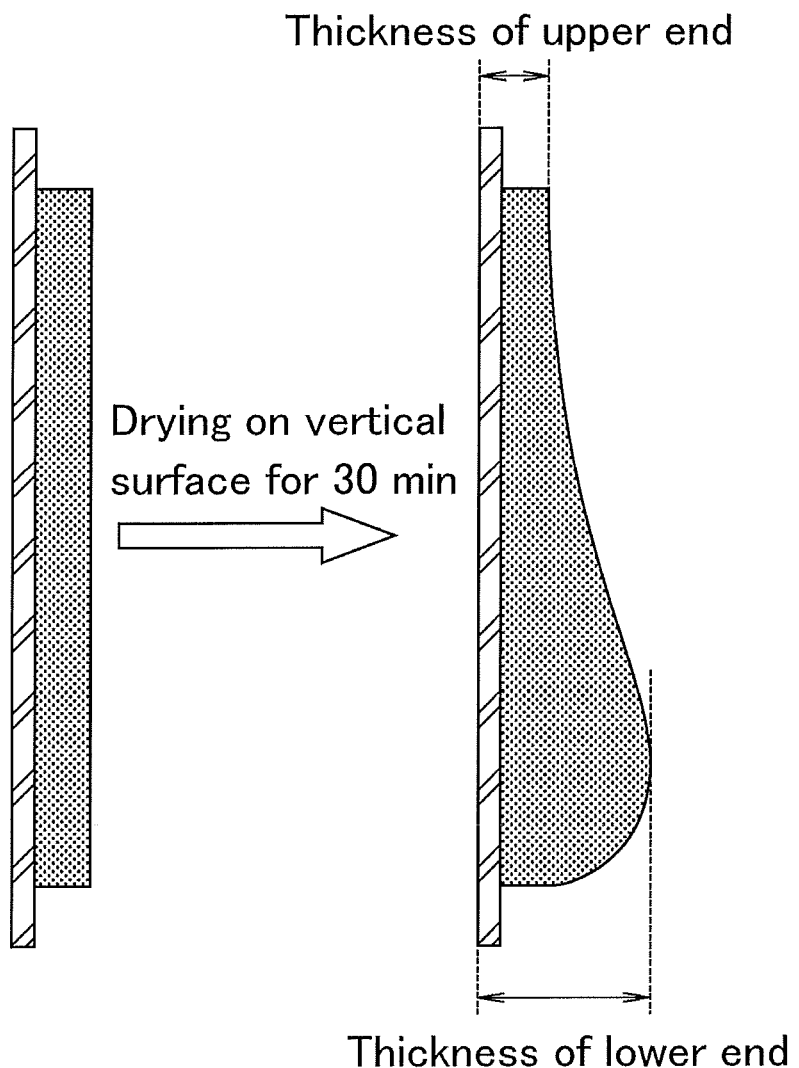

RESIN COMPOSITION FOR VIBRATION-DAMPING COATING MATERIAL, AND PRODUCTION METHOD THEREFOR

TECHNICAL FIELD

The invention relates to a vibration damping coating resin composition and a method for producing the composition. Specifically, the invention relates to a vibration damping coating resin composition suitable for various structures which are required to have a vibration damping property, a coating containing the vibration damping coating resin composition, a coat obtainable from the coating, and a method for producing the vibration damping coating resin composition.

BACKGROUND ART

Vibration damping materials are used to prevent vibration or noise of various structures to insure sustained quietude and have been widely used for underfloor spaces of automobile interior, transportation means such as railway vehicles, ships, and aircraft, electric devices, buildings, or construction machinery, for example. Conventional vibration damping materials are plate- or sheet-like molded products made from materials having vibration absorbing performance and sound absorbing performance. As an alternative to such molded products, vibration damping coatings have been proposed which can absorb vibration and sound in the form of a coat on the surface of structures of various shapes. Examples of vibration damping coatings proposed include those containing an emulsion prepared by emulsion polymerization of a monomer component (see, for example, Patent Literatures 1 to 3).

Another vibration damping material prepared from an emulsion is disclosed, although it is not a coating-type vibration damping material. Such a vibration damping material is a molded article obtained by preparing an emulsion powder from which a dispersion medium is removed, kneading the powder with another resin using an extruder, and injection-molding the kneaded material (see, for example, Patent Literatures 4 and 5).

CITATION LIST

Patent Literature

Patent Literature 1: JP 5289803 B
Patent Literature 2: JP 4630534 B
Patent Literature 3: U.S. Pat. No. 8,877,848 B
Patent Literature 4: JP 3703585 B
Patent Literature 5: JP H08-231731 A

SUMMARY OF INVENTION

Technical Problem

Although coatings which can absorb vibration and sound in the form of a coat have been proposed as described above, no coatings have been produced yet which can provide coats having excellent appearance and exhibit an excellent vibration damping property in a temperature range of a use environment of vibration damping materials (e.g., in the temperature range of 10° C. to 60° C. inside vehicles or in daily life).

The invention has been made in view of the state of the art and aims to provide a method for providing a coat having excellent appearance and an excellent vibration damping property in a temperature range of a use environment of vibration damping materials.

Solution to Problem

The inventors studied a method for providing a coat achieving both appearance and an excellent vibration damping property in a temperature range of a use environment of vibration damping materials and focused on the following issue. Conventional vibration damping coatings are usually formed from a resin having a glass transition temperature of −30° C. to 40° C., for example, because coatings formed from a resin having a glass transition temperature close to the temperature of their use environment usually exhibit a vibration damping property suitable for the temperature of their use environment. When such coatings are applied to a vertical or inclined surface and heat-dried, they are heated up to a temperature significantly higher than the glass transition temperature (e.g., 100° C. or higher). Thus, the coat sags due to heat, having poor appearance. The inventors made various studies for solving such a problem characteristic of coating-type vibration damping materials and found that sagging due to heat during heat-drying is suitably prevented by using an emulsion particle including an outermost layer and an inner layer located inside the outermost layer, the outermost layer including a resin having a glass transition temperature of 60° C. or higher which is not much lower than the temperature of heat-drying of the coating. Such an effect has been previously unknown. Use of such an emulsion particle can also sufficiently prevent blisters and/or cracks and provide a coat having good appearance. The inventors further studied and found that an emulsion particle having a thin outermost layer which is present in a proportion of 1% to 30% by mass in 100% by mass of the emulsion particle prevents sagging due to heat during heat-drying and blistering and cracking of the coat. Thus, a coat having good appearance and exhibiting an excellent vibration damping property at a desired temperature such as a temperature of a use environment of vibration damping materials can be obtained. Thus, both the appearance and the vibration damping property can be suitably achieved simultaneously.

The inventors further studied and found that an excellent vibration damping property at a temperature of a use environment of vibration damping materials is obtained and sagging due to heat is prevented by using an emulsion particle including an outermost layer and an inner layer located inside the outermost layer, in which the inner layer is formed from a resin having a specific glass transition temperature close to a temperature of a use environment of vibration damping materials and the glass transition temperature of the resin forming the outermost layer is higher than that of the resin forming the inner layer by 10° C. or more. Such an effect has been previously unknown. The inventors further found that sagging due to heat can be excellently prevented and blisters and/or cracks of a coat can be sufficiently prevented by using a vibration damping material resin composition containing a component having a sulfosuccinic acid (salt) structure and/or a component having a fatty acid (salt) structure. Thus, both the appearance and the vibration damping property can be suitably achieved simultaneously.

The present inventors thus arrived at an admirable solution to the problem, completing the invention.

That is, the invention relates to a vibration damping coating resin composition including an emulsion particle having a multilayer structure, the emulsion particle including an outermost layer and an inner layer located inside the outermost layer, the outermost layer being formed from a resin having a glass transition temperature of 60° C. or higher, the outermost layer being present in a proportion of 1% to 30% by mass in 100% by mass of the emulsion particle. Hereinafter, the invention according to this vibration damping coating resin composition is also referred to as a first aspect of the invention.

The invention also relates to a vibration damping material resin composition including an emulsion particle having a multilayer structure, in which the emulsion particle includes an outermost layer and an inner layer located inside the outermost layer; the inner layer is formed from a resin having a glass transition temperature of −10° C. to 35° C.; the glass transition temperature of the resin forming the outermost layer is higher than the glass transition temperature of the resin forming the inner layer by 10° C. or more; and the composition contains a component having a sulfosuccinic acid (salt) structure and/or a component having a fatty acid (salt) structure. Hereinafter, the invention according to this vibration damping material resin composition is also referred to as a second aspect of the invention.

These aspects of the invention are described in detail below.

Two or more of preferred embodiments of the first aspect of the invention or the second aspect of the invention described below may be combined to serve as another preferred embodiment of the invention.

Hereinafter, "the invention" means the first aspect of the invention unless otherwise stated. The features of the vibration damping material resin composition of the second aspect of the invention are suitably applicable to the vibration damping coating resin composition of the first aspect of the invention. The features of the vibration damping coating resin composition of the first aspect of the invention are also suitably applicable to the vibration damping material resin composition of the second aspect of the invention.

<Vibration Damping Coating Resin Composition of the Invention>

(Emulsion Particle Having Multilayer Structure)

The vibration damping coating resin composition of the invention contains an emulsion particle having a multilayer structure. The emulsion particle includes an outermost layer and an inner layer located inside the outermost layer. The outermost layer is formed from a resin having a glass transition temperature of 60° C. or higher. The outermost layer is present in a proportion of 1% to 30% by mass in 100% by mass of the emulsion particle.

The emulsion particle having a multilayer structure has only to have a structure including two or more layers in which two or more polymer chains are combined, and has only to include at least an outermost layer and an inner layer located inside the outermost layer. The emulsion particle may include multiple inner layers located inside the outermost layer. In particular, the emulsion particle having a multilayer structure preferably has a structure including two to four layers consisting of the outermost layer and at least one inner layer, more preferably a structure including two or three layers including the outermost layer and one or two inner layers, still more preferably a structure including two layers including the outermost layer and one inner layer (innermost layer).

The emulsion particle having a multilayer structure imparts an excellent vibration damping property in a wide temperature range of a use environment of vibration damping materials. The emulsion particle imparts a better vibration damping property particularly even in a high temperature range than vibration damping coating resin compositions having other structures. Thus, the emulsion particle can impart vibration damping performance in a wide temperature range from room temperature to high temperatures of a use environment of vibration damping materials.

In the emulsion particle having a multilayer structure, the surface of the inner layer is preferably completely covered with the outermost layer, but may not be completely covered therewith. For example, the inner layer may be covered in a mesh pattern or may be partly exposed.

The outermost layer of the emulsion particle is formed from a resin having a glass transition temperature of 60° C. or higher. Such an emulsion particle can sufficiently prevent sagging due to heat particularly when the coating is applied to a vertical or inclined surface and heat-dried. The reason why sagging due to heat is sufficiently prevented seems that emulsion particles with this glass transition temperature being 60° C. or higher slowly fuse each other when the coating is heat-dried, and thus the drying property of the coat is enhanced. Furthermore, the outermost layer formed from a resin having a glass transition temperature of 60° C. or higher can sufficiently prevent blisters and/or cracks and can give good appearance.

The glass transition temperature of the resin forming the outermost layer is preferably 70° C. or higher, more preferably 75° C. or higher, still more preferably 80° C. or higher, further preferably 90° C. or higher, particularly preferably 100° C. or higher, for example. In order to obtain a more excellent vibration damping property at a temperature of a use environment of vibration damping materials, the glass transition temperature is preferably 200° C. or lower, more preferably 180° C. or lower, still more preferably 150° C. or lower, particularly preferably 120° C. or lower, for example.

The glass transition temperature (Tg) of the emulsion herein corresponds to the glass transition temperature of the polymer that forms emulsion particles and can be determined by the method disclosed in the below described examples. The glass transition temperature of all emulsion particles means a Tg determined from the monomer compositions used in all stages (Total Tg).

In the second aspect of the invention, the glass transition temperature of the resin forming the outermost layer is preferably 0° C. to 200° C., more preferably 10° C. to 180° C., still more preferably 30° C. to 150° C., for example. In order to obtain a sufficient vibration damping property in a temperature range of a use environment of vibration damping materials and further prevent sagging due to heat during the formation of a coat, the glass transition temperature is particularly preferably 50° C. or higher. The above-described preferred glass transition temperatures of the resin forming the outermost layer in the invention are suitably applicable to the second aspect of the invention.

In the invention, the outermost layer is present in a proportion of 1% to 30% by mass in 100% by mass of the emulsion particle.

The vibration damping coating resin composition of the invention with the above specific proportion of the emulsion particle allows the emulsion particle to give a coat having good appearance in which sagging due to heat during heat-drying and blistering and cracking of the coat are prevented. In addition, the resin composition exhibits an excellent vibration damping property at a desired temperature such as a temperature of a use environment of vibration damping materials. Thus, both the appearance and the vibration damping property can be suitably achieved simultaneously. This is presumably because such emulsion particles in the invention in which the proportion of the outermost layer falls within the above range fuse each other to provide a coat having a sea-island structure, and in the coat, the sea portion formed from the resin forming the inner layer imparts a vibration damping property at a desired temperature, and the island portion formed from the resin forming the outermost layer prevents sagging due to heat, in a balanced manner.

In order to sufficiently prevent sagging due to heat, the proportion is more preferably 3% by mass or more, still more preferably 5% by mass or more, particularly preferably 10% by mass or more. In order to obtain an excellent vibration damping property at a temperature of a use environment of vibration damping materials, the proportion is more preferably 25% by mass or less, still more preferably. 20%. by mass or less, further preferably 17% by mass or less, particularly preferably 15% by mass or less.

In the second aspect of the invention, the proportion of the outermost layer is preferably 0.1% to 30% by mass in 100% by mass of the emulsion particle. The proportion is more preferably 0.5% by mass or more, still more preferably 1% by mass or more. The above-described preferred proportions by mass of the outermost layer in the invention are suitably applicable to the second aspect of the invention.

In the emulsion particle having a multilayer structure in the second aspect of the invention, the glass transition temperature of the resin forming the outermost layer is higher than the glass transition temperature of the resin forming the inner layer by 10° C. or more. The emulsion particle including an inner layer formed from a resin having a specific glass transition temperature close to a temperature of a use environment of vibration damping materials as described above and having such a difference between glass transition temperatures can impart a high vibration damping property in a temperature range of a use environment of vibration damping materials and can prevent sagging due to heat during the formation of a coat. The feature of giving a difference in glass transition temperature between the resin forming the outermost layer and the resin forming the inner layer is applicable as a preferred embodiment of the first aspect of the invention. That is, in any of more preferred embodiments of the above-described vibration damping coating resin composition, the glass transition temperature of the resin forming the outermost layer is higher than the glass transition temperature of the resin forming the inner layer by 10° C. or more.

The difference in glass transition temperature between the resin forming the outermost layer and the resin forming the inner layer is preferably 15° C. or more, more preferably 20° C. or more, still more preferably 25° C. or more.

In particular, in any of more preferred embodiments of the above-described vibration damping coating resin composition, the glass transition temperature of the resin forming the outermost layer is higher than the glass transition temperature of the resin forming the inner layer by 30° C. or more in the emulsion particle. With such a difference in glass transition temperature, the vibration damping coating resin composition of the invention significantly imparts a high vibration damping property in a temperature range of a use environment of vibration damping materials and significantly prevents sagging due to heat during the formation of a coat.

The difference in glass transition temperature between the resin forming the outermost layer and the resin forming the inner layer is more preferably 50° C. or more, still more preferably 80° C. or more, particularly preferably 100° C. or more. The difference is preferably 180° C. or less, more preferably 160° C. or less, still more preferably 150° C. or less, further preferably 140° C. or less, further more preferably 130° C. or less, still further more preferably 120° C. or less, particularly preferably 110° C. or less.

In cases where the emulsion particle includes multiple inner layers, the glass transition temperature of the resin forming the outermost layer only has to be higher than that of the resin forming the inner layer having the lowest glass transition temperature among the multiple inner layers by the above-described degrees or more. Preferably, the glass transition temperature of the resin forming the outermost layer is higher than that of the resin forming the inner layer having the highest glass transition temperature among the multiple inner layers by the above-described degrees or more.

In any of more preferred embodiments of the above-described vibration damping coating resin composition, the emulsion particle having a multilayer structure includes an inner layer formed from a resin having a glass transition temperature of −30° C. to 40° C.

The emulsion particle in the invention is capable of imparting a vibration damping property at a desired temperature by controlling the glass transition temperature of the resin forming the inner layer. With the above specific glass transition temperature of the resin forming the inner layer, the vibration damping performance in a temperature range of a use environment of vibration damping materials can be effectively achieved. The glass transition temperature is more preferably −25° C. to 30° C., still more preferably −20° C. to 20° C., further preferably −15° C. to 15° C., particularly preferably −10° C. to 10° C.

In the second aspect of the invention, the emulsion having a multilayer structure includes an inner layer formed from a resin having a glass transition temperature of −10° C. to 35° C. This feature is applicable as a preferred embodiment of the first aspect of the invention. For example, in any of more preferred embodiments of the above-described vibration damping coating resin composition, the inner layer is formed from a resin having a glass transition temperature of −10° C. or higher. In any of more preferred embodiments of the above-described vibration damping coating resin composition, the inner layer is formed from a resin having a glass transition temperature of 35° C. or lower. Use of the emulsion having such a glass transition temperature in the invention can effectively impart the vibration damping performance in the temperature range for practical use of a coat. The glass transition temperature of the resin forming the inner layer is more preferably −9° C. to 30° C., still more preferably −7° C. to 20° C., particularly preferably −4° C. to 13° C.

In cases where the emulsion particle includes multiple inner layers, at least one of the inner layers has a glass transition temperature within the above-described range. Preferably, the inner layers each have a glass transition temperature within the above-described range.

The resin forming the emulsion particle preferably has a weight average molecular weight of 30000 to 500000. The vibration damping property is preferably achieved by converting the energy due to vibration applied to the polymers into frictional thermal energy. Thus, the polymers need to be movable when vibration is applied thereto. In the emulsion particle having such a weight average molecular weight, the polymers are sufficiently movable when vibration is applied thereto. Thus, the high vibration damping property can be achieved. The weight average molecular weight is more preferably 35000 or greater, still more preferably 50000 or greater, particularly preferably 90000 or greater. The weight average molecular weight is more preferably 420000 or less, still more preferably 400000 or less, particularly preferably 270000 or less. In other words, the weight average molecular weights of the resin forming the emulsion particle herein refer to the weight average molecular weights of the polymers forming the emulsion particle.

The weight average molecular weight (Mw) can be measured by gel permeation chromatography (GPC) under the conditions disclosed in the below described examples.

The emulsion particle may be any emulsion particle. For example, the emulsion particle preferably contains a polymer including a carboxylic acid (salt) group-containing monomer unit. The carboxylic acid (salt) group means a carboxylic acid group and/or a carboxylic acid salt group. The phrase "the emulsion particle contains a polymer including a carboxylic acid (salt) group-containing monomer unit" means that a carboxylic acid (salt) group-containing monomer may be contained in either the monomer component forming the inner layer of the emulsion particle or the monomer component forming the outermost layer of the emulsion particle or may be contained in both of these, for example. Preferably, a carboxylic acid (salt) group-containing monomer is contained in at least the monomer component forming the inner layer.

The salt of the carboxylic acid salt group-containing monomer unit is preferably a metal salt, an ammonium salt, or an organic amine salt, for example. Suitable examples of the metal atom of the metal salt include monovalent metal atoms such as lithium, sodium, potassium, and other alkali metal atoms; divalent metal atoms such as calcium and magnesium; and trivalent metal atoms such as aluminum and iron. Suitable examples of the organic amine salt include alkanolamine salts such as an ethanolamine salt, diethanolamine salt, and a triethanolamine salt; and a triethylamine salt.

In any of more preferred embodiments of the above-described vibration damping coating resin composition, the carboxylic acid (salt) group-containing monomer unit is a constituent unit derived from a (meth)acrylic acid monomer. In other words, the emulsion particle preferably contains a (meth)acrylic polymer. The (meth)acrylic polymer refers to a polymer including a constituent unit derived from a (meth)acrylic acid monomer.

For example, the (meth)acrylic polymer is preferably produced from a monomer component that includes a (meth)acrylic acid monomer and a different copolymerizable unsaturated monomer. The presence of the (meth)acrylic acid monomer improves the dispersibility of components such as an inorganic pigment in the coating containing the vibration damping coating resin composition of the invention. Thereby, the resulting coat can have better functions. Furthermore, the presence of the different copolymerizable unsaturated monomer enables easy control of the acid value, glass transition temperature, physical properties, and other properties of the polymer.

The (meth)acrylic acid monomer contains at least one group selected from an acryloyl group, a methacryloyl group, and a group obtained by replacing a hydrogen atom in either of these groups with another atom or an atomic group, and the carbonyl group of the at least one group forms a carboxyl group (—COOH group), a salt thereof, or an acid anhydride group (—C(=O)—O—C(=O)— group). The (meth)acrylic acid monomer is preferably (meth)acrylic acid.

Preferred examples of the salt of a carboxyl group of the (meth)acrylic acid monomer include a metal salt, an ammonium salt, and an organic amine salt. Examples of the metal salt and organic amine salt include the same salts listed as the salts of the carboxylic acid salt group-containing monomer unit.

The (meth)acrylic polymer is preferably prepared by copolymerization of a monomer component including 0.1% to 5% by mass of the (meth)acrylic acid monomer and 95% to 99.9% by mass of the different copolymerizable unsaturated monomer, for example. The monomer component more preferably includes 0.3% by mass or more of the (meth)acrylic acid monomer and 99.7% by mass or less of the different copolymerizable unsaturated monomer, still more preferably 0.5% by mass or more of the (meth)acrylic acid monomer and 99.5% by mass or less of the different copolymerizable unsaturated monomer, particularly preferably 0.7% by mass or more of the (meth)acrylic acid monomer and 99.3% by mass or less of the different copolymerizable unsaturated monomer. The monomer component includes more preferably 4% by mass or less of the (meth)acrylic acid monomer and 96% by mass or more of the different copolymerizable unsaturated monomer, still more preferably 3% by mass or less of the (meth)acrylic acid monomer and 97% by mass or more of the different copolymerizable unsaturated monomer. The monomer component with the above described composition can be stably copolymerized. When a carboxylic acid group is introduced into the emulsion particle by copolymerization of (meth)acrylic acid, the emulsion particle is allowed to contain a polymer that includes a carboxylic acid (salt) group-containing constituent unit by neutralizing the carboxylic acid group using a neutralizer described below. In other words, the (meth)acrylic polymer is preferably a copolymer in which the constituent unit derived from the (meth)acrylic acid monomer is present in an amount of 0.1% to 5% by mass, more preferably 0.3% to 5% by mass, still more preferably 0.5% to 4% by mass, particularly preferably 0.7% to 3% by mass in all the constituent units of the (meth)acrylic polymer.

Examples of the different copolymerizable unsaturated monomer include (meth)acrylic monomers other than the (meth)acrylic acid monomer, aromatic ring-containing unsaturated monomers, and other copolymerizable unsaturated monomers.

The (meth)acrylic monomers other than the (meth)acrylic acid monomer refer to monomers that contain an acryloyl group, a methacryloyl group, or a group obtained by replacing a hydrogen atom in either of these groups with another atom or an atomic group, and contain an esterified carboxyl group; or refer to derivatives of the monomers.

Examples of the (meth)acrylic monomers other than the (meth)acrylic acid monomer include methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, 2-hydroxyethyl acrylate, 2-hydroxyethyl methacrylate, 2-hydroxypropyl acrylate, 2-hydroxypropyl methacrylate, diallyl phthalate, triallyl cyanurate, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, and allyl methacrylate; and esters of (meth)acrylic acid monomers other than these. Preferably, one or two or more of these may be used.

The monomer component for producing the (meth)acrylic polymer contains the (meth)acrylic monomer other than the (meth)acrylic acid monomer in an amount of preferably 20% by mass or more, more preferably 30% by mass or more, still more preferably 40% by mass or more, particularly preferably 60% by mass or more of 100% by mass of the entire monomer component used to produce the emulsion particle. The amount of the (meth)acrylic monomer other than the (meth)acrylic acid monomer is preferably 99.9% by mass or less, more preferably 99.5% by mass or less of 100% by mass of the entire monomer component.

Examples of the aromatic ring-containing unsaturated monomers include divinylbenzene, styrene, a-methylstyrene, vinyl toluene, and ethylvinylbenzene. Preferred is styrene. That is, it is a preferred embodiment of the invention that the (meth)acrylic polymer is a styrene (meth)acrylic polymer obtained from a monomer component containing styrene. Such an embodiment enables cost reduction and sufficient exhibition of the effects of the invention.

When the monomer component for producing the (meth) acrylic polymer contains the aromatic ring-containing unsaturated monomer, the monomer component contains the aromatic ring-containing unsaturated monomer in an amount of preferably 1% by mass or more, more preferably 5% by mass or more, still more preferably 10% by mass or more, further preferably 20% by mass or more, further more preferably 40% by mass or more, still further more preferably 50% by mass or more, particularly preferably 55% by mass or more of 100% by mass of the entire monomer component used to produce the emulsion particle. Meanwhile, the monomer component contains the aromatic ring-containing unsaturated monomer in an amount of preferably 90% by mass or less, more preferably 80% by mass or less, still more preferably 70% by mass or less of 100% by mass of the entire monomer component. The monomer component for producing the (meth)acrylic polymer may not include the aromatic ring-containing unsaturated monomer.

Examples of the other copolymerizable unsaturated monomers include polyfunctional unsaturated monomers such as acrylonitrile, vinyl formate, vinyl acetate, vinyl propionate, and trimethylolpropane diallyl ether.

The average particle size of the emulsion particles is preferably 80 to 450 nm.

Use of emulsion particles having an average particle size within the above-described range can achieve a better vibration damping property as well as sufficient basic performance required for the vibration damping material, such as the appearance of a coat or easiness of coating. The average particle size of the emulsion particles is more preferably 400 nm or smaller, still more preferably 350 nm or smaller. The average particle size is more preferably 100 nm or greater.

The average particle size of the emulsion particles can be measured by the method disclosed in the below described examples.

The amount of the solids content of the emulsion particles is preferably 20% by mass or more, more preferably 30% by mass or more, still more preferably 40% by mass or more, particularly preferably 50% by mass or more in 100% by mass of the solids of the vibration damping coating resin composition of the invention. The amount is preferably 99% by mass or less, more preferably 97% by mass or less, still more preferably 95% by mass or less, particularly preferably 93% by mass or less, most preferably 91% by mass or less.

The solids refer to components excluding solvents such as aqueous solvents.

(Surfactant Component)

The vibration damping coating resin composition of the invention may further contain a surfactant component.

The phrase "the vibration damping coating resin composition of the invention contains a surfactant component" means that (1) the composition may include the surfactant component which is introduced by using the component as an emulsifier for preparation of emulsion particles in emulsion polymerization, (2) the composition may include the surfactant component which is introduced by using part of the component as an emulsifier in emulsion polymerization and adding the rest of the component to the resulting emulsion particles, (3) the composition may include the surfactant component which is introduced by allowing the component as an emulsifier to act on a polymer prepared by a method other than emulsion polymerization to form emulsion particles, or (4) the composition may include the surfactant component which is introduced by adding the component to the emulsion particles prepared by emulsion polymerization using another emulsifier. In order to more sufficiently obtain the effects of the invention, the processes (1) to (3) in which the surfactant component serves as an emulsifier are preferred. The phrase "the surfactant component serves as an emulsifier" means that the component covers the surface of an emulsion particle, and the hydrophilic group (e.g., acid (salt) groups) of the component faces a solvent such as an aqueous solvent (the side opposite to the emulsion particle), and the hydrophobic group (e.g., sites other than acid (salt) groups) of the component faces the emulsion particle. Here, the phrase "component covers the surface of an emulsion particle" includes the case in which the component does not completely cover the surface. For example, the emulsion particle may be partly exposed.

The surfactant component may be present in the form of a compound different from the polymer that forms the emulsion; part of the surfactant component may be present in the form of such a compound and the rest may be present in the form of a constituent unit of the polymer that forms the emulsion (e.g., such a compound is introduced in the form of a constituent unit of the polymer that forms the emulsion during emulsion polymerization); or the surfactant component may be present in the form of a constituent unit of the polymer that forms the emulsion. In particular, at least part of the surfactant component is preferably present in the form of such a compound.

The surfactant component encompasses all the agents which can serve as a surfactant in the vibration damping coating resin composition of the invention, regardless of the purpose of use thereof. That is, the surfactant component in the vibration damping coating resin composition of the invention may have a different function as long as it serves as a surfactant. The surfactant component may be used as an emulsifier (e.g., emulsifier for emulsion polymerization), a dispersant, a wet penetrant, or a foaming agent, for example.

Examples of the surfactant component include anionic, cationic, nonionic, amphoteric, and polymeric surfactants. One or two or more of these may be used. Preferred examples of the anionic surfactant include fatty acids (and salts thereof), alkyl ether carboxylic acids (and salts thereof), N-acylamino acids (and salts thereof), alkane sulfonic acids (and salts thereof), α-olefin sulfonic acids (and salts thereof), α-sulfoalkyl esters (and salts thereof), alkyl sulfosuccinic acids (and salts thereof), acylisethionic acids (and salts thereof), N-acyl-N-alkyl taurines (and salts thereof), alkyl sulfuric acid esters (and salts thereof), alkyl ether sulfuric acid esters (and salts thereof), alkyl phosphoric acid esters (and salts thereof), polyoxyalkylene alkyl ether phosphoric acid esters (and salts thereof), polyoxyalkylene styrenated aryl ether sulfuric acid esters (and salts thereof), and alkyl diphenyl ether disulfonic acid salts. One or two or more of these may be used. In order to provide a coat having a much better drying property and significantly excellent appearance in which blisters during its formation are prevented, preferred among these are fatty acids (and salts thereof), alkyl sulfosuccinic acids (and salts thereof), and polyoxyalkylene styrenated aryl ether sulfuric acid esters (and salts thereof). In particular, in order to obtain much better effects of the invention, alkyl sulfosuccinic acids (and salts thereof) are more preferred.

Examples of commercially available products of the polyoxyalkylene styrenated aryl ether sulfuric acid esters (and salts thereof) include HITENOL NF-08 (trade name, Dai-Ichi Kogyo Seiyaku Co., Ltd.).

Examples of the anionic surfactant further include reactive surfactants such as sulfosuccinic acid salt-type reactive anionic surfactants and alkenyl succinic acid salt-type reactive anionic surfactants. One or two or more of these may be used.

Examples of commercially available products of the sulfosuccinic acid salt-type reactive anionic surfactants include LATEMUL S-120, S-120A, S-180, and S-180A (trade name, Kao Corporation), and ELEMINOL JS-20 (trade name, Sanyo Chemical Industries, Ltd.).

Examples of commercially available products of the alkenyl succinic acid salt-type reactive anionic surfactants include LATEMUL ASK (trade name, Kao Corporation).

Additional examples of the anionic surfactant to be used include alkylbenzene sulfonic acids (and salts thereof) such as NEOPELEX G-65 (trade name, sodium dodecylbenzenesulfonate, Kao Corporation), polyoxyalkylene polycyclic phenyl ether sulfuric acid esters (and salts thereof) such as NEWCOL 707SF (trade name, polyoxyethylene polycyclic phenyl ether sulfate, Nippon Nyukazai Co., Ltd.), and polyoxyalkylene alkyl ether sulfuric acids (and salts thereof) such as LEVENOL WX (trade name, polyoxyethylene alkyl ether sodium sulfate, Kao Corporation).

Non-limiting examples of the nonionic surfactant include polyoxyethylene alkyl ethers; polyoxyethylene alkylaryl ethers; sorbitan aliphatic esters; polyoxyethylene sorbitan aliphatic esters; aliphatic monoglycerides such as glycerol monolaurate; polyoxyethylene-oxypropylene copolymers; and condensates of ethylene oxide with an aliphatic amine, amide, or acid. For example, EMULGEN 1118S (Kao Corporation) is commercially available as the nonionic surfactant. The nonionic surfactant may also be a reactive one such as allyloxymethyl alkoxy ethyl hydroxy polyoxyethylene (e.g., "ADEKA REASOAP ER-20", ADEKA Corporation); and polyoxyalkylene alkenyl ether (e.g., "LATEMUL PD-420", "LATEMUL PD-430", Kao Corporation). One or two or more of these may be used.

Non-limiting examples of the cationic surfactant include dialkyl dimethyl ammonium salts, ester-type dialkyl ammonium salts, amide-type dialkyl ammonium salts, and dialkylimidazolinium salts. One or two or more of these may be used.

Non-limiting examples of the amphoteric surfactant include alkyldimethylaminoacetic acid betaine, alkyldimethylamine oxide, alkyl carboxymethyl hydroxyethyl imidazolinium betaine, alkyl amide propyl betaine, and alkyl hydroxy sulfobetaine. One or two or more of these may be used.

Non-limiting examples of the polymeric surfactant include polyvinyl alcohols and modified products thereof; (meth)acrylic water-soluble polymers; hydroxyethyl (meth) acrylic water-soluble polymers; hydroxypropyl (meth) acrylic water-soluble polymers; and polyvinyl pyrrolidone. One or two or more of these may be used.

The surfactant component may further contain a substitutent. Examples of the substituent include a hydrocarbon group, an amino group, an alkoxy group, an alkylamino group, an alkoxysulfonyl group, a sulfoalkyl group, an aminoalkyl group, a carboxylic acid group, a polyalkylene oxide chain-containing group, and an alkenyloxy group.

In order to provide a coat having better appearance, the surfactant component is preferably a compound that does not have a reactive unsaturated carbon-carbon bond. When a compound that does not have a reactive unsaturated carbon-carbon bond is used as the surfactant component, the vibration damping coating resin composition of the invention contains a surfactant (in the form of a compound different from the polymer that forms the emulsion particle) in addition to a constituent unit of the polymer that forms the emulsion particle. Thereby, an effect of providing a coat having good appearance, which is one of the effects of the invention, can be significantly achieved.

The surfactant component is obtainable appropriately by a conventionally known method. The surfactant component may also be a commercial product or a product prepared by adding an aqueous solvent to a commercial product so that the solid concentration is appropriately adjusted.

The vibration damping coating resin composition of the invention preferably contains 0.1% to 20% by mass of the surfactant component relative to 100% by mass of the entire monomer component used to produce the emulsion particle. In order to more significantly achieve the effects of the invention, the amount of the surfactant component is more preferably 0.5% by mass or more, still more preferably 1% by mass or more, particularly preferably 2% by mass or more. The amount of the surfactant component is more preferably 15% by mass or less, still more preferably 10% by mass or less, further preferably 8% by mass or less, further more preferably 6% by mass or less, particularly preferably 4% by mass or less.

Herein, the entire monomer component used to produce the emulsion particle includes monomer units constituting the polymers that form the emulsion particle and monomers and oligomers derived from a monomer used to produce the emulsion particles in the vibration damping coating resin composition of the invention, excluding the surfactant component. The amount of the surfactant component corresponds to the sum of the amount of the surfactant (in the form of a compound different from the polymer that forms the emulsion particle) and the amount of the constituent unit derived from the compound, in the polymer that forms the emulsion particle. In other words, the amount of the surfactant component corresponds to the total amount of all the surfactants used to produce the vibration damping coating resin composition of the invention.

The amount of the surfactant component in, the vibration damping coating resin composition of the invention including the amount of the surfactant component in the form of a constituent unit of part of the polymer that forms the emulsion particle can be calculated as the sum of the amounts of all the surfactants used to produce the composition. Alternatively, the amount of the surfactant component can also be calculated as the sum of the amount of the surfactant (in the form of a compound different from the polymer that forms the emulsion particle) and the amount of the constituent unit derived from the surfactant in the polymer that forms the emulsion particle.

It is a preferred embodiment of the vibration damping coating resin composition of the invention that a preferred amount of the surfactant (in the form of a compound different from the polymer that forms the emulsion particle) in the vibration damping coating resin composition of the invention falls within the above preferred ranges of the amount of the surfactant component. In this preferred embodiment, the vibration damping coating resin composition of the invention may contain the surfactant component in the form of a constituent unit of the polymer that forms the emulsion particle in addition to the surfactant.

The amount of the surfactant in the vibration damping coating resin composition of the invention may be determined by high-performance liquid chromatograph analysis of the components extracted from the heat-dried coat. This method is capable of analyzing the surfactant component present not in the form of the constituent unit of the polymer that forms the emulsion particle even when the surfactant having a reactive unsaturated carbon-carbon bond is used in polymerization.

The vibration damping material resin composition of the second aspect of the invention further contains a component having a sulfosuccinic acid (salt) structure and/or a component having a fatty acid (salt) structure. This feature is applicable as a preferred embodiment of the first aspect of the invention as described above. That is, in any of more preferred embodiments of the above-described vibration damping coating resin composition, the vibration damping coating resin composition of the invention further contains a component having a sulfosuccinic acid (salt) structure and/or a component having a fatty acid (salt) structure.

The following specifically describes a component having a sulfosuccinic acid (salt) structure and/or a component having a fatty acid (salt) structure, which are suitably used as the surfactant component in the invention.
(Component Having Sulfosuccinic Acid (Salt) Structure and/or Component Having Fatty Acid (Salt) Structure)

The use of the vibration damping material resin composition of the second aspect of the invention can suitably provide a coat having excellent appearance and capable of exhibiting a significantly excellent vibration damping property in a temperature range of a use environment of vibration damping materials.

The reason why the use of the vibration damping material resin composition of the second aspect of the invention can provide a coat having excellent appearance is considered as follows. First, a component having a sulfosuccinic acid (salt) structure and/or a component having a fatty acid (salt) structure express solidification (gelation) effects at high temperature of heat-drying (baking), resulting in prevention of sagging due to heat during the formation of a coat. In addition, the vibration damping material resin composition of the second aspect of the invention containing a component having a sulfosuccinic acid (salt) structure and/or a component having a fatty acid (salt) structure can provide a coat in which blisters are prevented. This is presumably because a component having a sulfosuccinic acid (salt) structure and a component having a fatty acid (salt) structure may have an emulsifying property and a thermal foaming property and may cause fine foaming due to boiling from the early stage of drying, for example. Thus, the moisture may remain released even under heating. This may provide a coat in which blisters are prevented.

In addition, a component having a sulfosuccinic acid (salt) structure and a component having a fatty acid (salt) structure are easily available and less costly. Thus, they are advantageously used to prepare the vibration damping material resin composition of the second aspect of the invention.
(Component Having Sulfosuccinic Acid (Salt) Structure)

The sulfosuccinic acid (salt) structure refers to a structure in which a sulfonic acid (salt) group is bonded to at least one carbon atom of —C—C— in the structure represented by —CO—C—C—COOR (wherein R represents a hydrogen atom, an alkyl group, a metal salt, an ammonium salt, or an organic amine salt).

The alkyl group for R is preferably a C1-C20 alkyl group, more preferably a C2-C15 alkyl group, still more preferably a C5-C10 alkyl group, particularly preferably a 2-ethylhexyl group, for example. Examples of the metal atom of the metal salt for R include monovalent metal atoms such as lithium, sodium, potassium, and other alkali metal atoms; divalent metal atoms such as calcium and magnesium; and trivalent metal atoms such as aluminum and iron. Examples of the organic amine salt for R include alkanolamine salts such as an ethanolamine salt, a diethanolamine salt, and a triethanolamine salt; and a triethylamine salt.

R is preferably a hydrogen atom, an alkyl group, or a metal atom, more preferably an alkyl group or a metal atom, still more preferably a metal atom. Preferred among the metal atoms are monovalent metal atoms, and sodium is more preferred.

The sulfonic acid (salt) group means a sulfonic acid group and/or a sulfonic acid salt group. Examples of the sulfonic acid salt group include metal salts, ammonium salts, and organic amine salts of a sulfonic acid group, and mixtures of these salts.

Examples of the organic amine salts and the metal atoms of the metal salts include the same as those listed above.

In order to sufficiently achieve the functions of a coat, the sulfonic acid (salt) group is more preferably a sulfonic acid group, a sodium sulfonate group, a magnesium sulfonate group, or a calcium sulfonate group; still more preferably a sodium sulfonate group, a magnesium sulfonate group, or a calcium sulfonate group; particularly preferably a sodium sulfonate group.

The sulfosuccinic acid (salt) structure further contains a hydrogen atom and/or a monovalent substituent other than a hydrogen atom bonded thereto. The component having a sulfosuccinic acid (salt) structure may be in the form of a constituent unit of the polymer in the emulsion which is formed during polymerization, which is derived from a sulfosuccinic acid (salt) structure-containing compound having a reactive unsaturated carbon-carbon bond. Examples of the sulfosuccinic acid (salt) structure-containing compound having a reactive unsaturated carbon-carbon bond include ELEMINOL JS-20 (trade name, Sanyo Chemical Industries, Ltd.) as described above. However, in order to provide a coat having better appearance, the component having a sulfosuccinic acid (salt) structure is preferably a compound that does not have a reactive unsaturated carbon-carbon bond. When the component having a sulfosuccinic acid (salt) structure is a compound that does not have a reactive unsaturated carbon-carbon bond, the vibration damping coating resin composition of the first aspect of the invention or the vibration damping material resin composition of the second aspect of the invention contains a sulfosuccinic acid (salt) structure-containing compound in addition to a constituent unit of the polymer that forms the emulsion. Thereby, an effect of providing a coat having good appearance, which is one of the effects of the invention, can be significantly achieved.

Examples of the substituent include specific examples of the substituent which may be contained in the above-described surfactant component. For example, the component having a sulfosuccinic acid (salt) structure preferably has a hydrocarbon group, more preferably has a hydrocarbon group having 8 or more carbon atoms, still more preferably a hydrocarbon group having 12 or more carbon atoms.

The component having a sulfosuccinic acid (salt) structure also preferably has a polyalkylene oxide chain-containing group. The polyalkylene oxide chain-containing group may be a group consisting only of a polyalkylene oxide chain or a group containing a polyalkylene oxide chain and a different structural site. Examples of the different structural site include hydrocarbon groups such as aliphatic saturated hydrocarbon groups and aromatic hydrocarbon groups. The polyalkylene oxide chain-containing group is preferably a group consisting only of a polyalkylene oxide chain or a group in which a hydrogen atom or a hydrocarbon group is bonded to an oxygen atom at an end of the polyalkylene oxide chain. For example, the component having a sulfosuccinic acid (salt) structure more preferably has a polyalkylene oxide chain-containing group and a hydrocarbon group, which has 8 or more carbon atoms, still more preferably 12 or more carbon atoms, bonded to an end of the polyalkylene oxide chain-containing group.

The component having a sulfosuccinic acid (salt) structure has an oxyalkylene group that constitutes the polyalkylene oxide chain, and the average number of moles of oxyalkylene group added is preferably 3 or greater, more preferably 4 or greater, still more preferably 5 or greater. The average number of moles added means the average of the number of moles of oxyalkylene group added per mole of the polyalkylene oxide chain of the component having a sulfosuccinic acid (salt) structure.

The above-described sulfosuccinic acid (salt) structure-containing compound which does not have a reactive unsaturated carbon-carbon bond is preferably represented, for example, by the following formula (1):

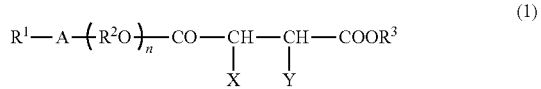

(1)

wherein $R^1$ represents a hydrogen atom or a C1-C30 alkyl group; -A- represents —O— or —NH—; $R^2$ represents a C1-C30 alkylene group; the average number n of moles added is 0 to 200; X and Y are the same as or different from each other and each represent a hydrogen atom or a sulfonic acid (salt) group; at least one of X and Y represents a sulfonic acid (salt) group; and $R^3$ represents a hydrogen atom, an alkyl group, a metal salt, an ammonium salt, or an organic amine salt.

$R^1$ preferably represents a C1-C30 alkyl group. The number of carbon atoms of the alkyl group is preferably 4 or greater, more preferably 8 or greater. In order to provide a coat in which blisters and cracks are further prevented and having a much better vibration damping property, the number of carbon atoms is still more preferably 12 or greater. The number of carbon atoms of the alkyl group is preferably 25 or smaller, more preferably 20 or smaller.

The alkyl group is preferably a primary alkyl group or a secondary alkyl group.

In order to improve the vibration damping property and the mechanical stability in a balanced manner, -A- preferably represents —NH—.

$R^2$s preferably mainly include a C2-C4 alkylene group such as an ethylene group, a propylene group, or a butylene group, more preferably an ethylene group.

The term "mainly" herein means that when the $(R^2O)_n$ site includes two or more oxyalkylene groups, the oxyalkylene groups account for preferably 50 to 100 mol % of the total number of $R^2$s.

The $(R^2O)_n$ site more preferably consists only of ethylene groups.

The average number n of moles added is preferably 3 to 200. In order to enhance the function of the sulfosuccinic acid (salt) structure-containing compound as an emulsifier to improve the vibration damping property, the average number n of moles added is more preferably 4 or greater, still more preferably 5 or greater, further more preferably 6 or greater, particularly preferably 7 or greater. The average number n of moles added is more preferably 100 or smaller, still more preferably 50 or smaller, further more preferably 20 or smaller, particularly preferably 10 or smaller.

Also preferably, -A- represents —NH—, and the average number n of moles added is 0.

X and Y are the same as or different from each other and each represent a hydrogen atom or a sulfonic acid (salt) group. At least one of X and Y represents a sulfonic acid (salt) group. Preferably, either one of X and Y represents a sulfonic acid (salt) group, and the other represents a hydrogen atom. A preferred sulfonic acid (salt) group is as described above.

$R^3$ represents a hydrogen atom, an alkyl group, a metal salt, an ammonium salt, or an organic amine salt. $R^3$ is more preferably an alkyl group or a metal salt, still more preferably a metal salt. Examples of the metal atom of the metal salt include alkali metal atoms such as lithium, sodium, and potassium. Particularly preferred among these is sodium. Examples of the alkyl group and the organic amine salt for $R^3$ are the same as those described above.

The sulfosuccinic acid (salt) structure-containing compound that does not have a reactive unsaturated carbon-carbon bond is preferably represented by, for example, the following formula (2):

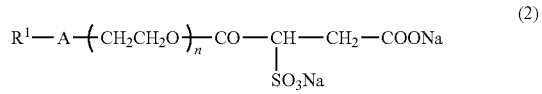

(2)

wherein $R^1$, -A-, and the average number n of moles added are the same as those for the formula (1).

The sulfosuccinic acid (salt) structure-containing compound is obtainable by reacting sulfosuccinic acid with a compound having a substituent by a conventionally known method, for example. When the substituent is a polyalkylene oxide chain-containing group, the polyalkylene oxide chain-containing group can be introduced into the sulfosuccinic acid (salt) structure by reaction of an alkylene oxide such as ethylene oxide or a polyalkylene oxide chain-containing compound with a carboxylic acid group of the sulfosuccinic acid, for example. The sulfosuccinic acid (salt) structure-containing compound may be a commercial product or a product prepared by adding an aqueous solvent to a commercial product so that the solid concentration is appropriately adjusted.

(Component Having Fatty Acid (Salt) Structure)

The component having a fatty acid (salt) structure refers to a compound having a structure containing a carboxylic acid (salt) group bonded to a hydrocarbon. Examples of the component having a fatty acid structure include saturated fatty acids and unsaturated fatty acids such as monounsaturated fatty acids and polyunsaturated fatty acids. Examples of the component having a fatty acid salt structure include metal salts, ammonium salts, and organic amine salts of saturated fatty acids or unsaturated fatty acids and mixtures of these salts. Examples of the organic amine salts and the metal atoms of the metal salts include the same as those for the component having a sulfosuccinic acid (salt) structure as described above. The carboxylic acid (salt) group means a carboxylic acid group and/or a carboxylic acid salt group.

The component having a fatty acid (salt) structure may further contain a monovalent substituent other than alkyl groups, carboxylic acid groups, and carboxylic acid salt groups. The component having a fatty acid (salt) structure may be in the form of a constituent unit of the polymer in the emulsion which is formed during polymerization, from a fatty acid (salt) structure-containing compound having a reactive unsaturated carbon-carbon bond or may be not in the form of a constituent unit of the emulsion polymer because the fatty acid (salt) structure-containing compound does not have a reactive unsaturated carbon-carbon bond. Preferred is a fatty acid (salt) structure-containing compound that does not have a reactive unsaturated carbon-carbon bond, present not in the form of a constituent unit of the emulsion polymer.

Examples of the monovalent substituent include an amino group, an alkoxy group, an alkoxy sulfonyl group, a sulfoalkyl group, an amino alkyl group, a hydroxyl group, and a polyalkylene oxide chain-containing group.

The fatty acid (salt) structure-containing compound that does not have a reactive unsaturated carbon-carbon bond is preferably represented by, for example, the following formula (3):

$$R^4COOM \quad (3)$$

wherein $R^4$ represents a hydrocarbon group which may optionally have a substituent, and M represents a metal atom, an ammonium group, or an organic amine group.

The hydrocarbon group for $R^4$ is preferably a C1-C30 hydrocarbon group. In order to provide a coat having better appearance improved by sufficiently enhancing the thermal foaming property of the fatty acid (salt) structure-containing compound, the number of carbon atoms is more preferably 4 or greater, still more preferably 8 or greater, particularly preferably 12 or greater. The number of carbon atoms is more preferably 26 or smaller, still more preferably 22 or smaller, particularly preferably 18 or smaller.

The hydrocarbon group for $R^4$ may only have a single bond in the carbon chain or may have an unsaturated bond such as a double bond or a triple bond in the carbon chain.

The hydrocarbon group for $R^4$ may be linear, branched, or cyclic. Preferred is a linear hydrocarbon group.

The hydrocarbon group for $R^4$ may be substituted with a carboxylic acid group, a carboxylic acid salt group, or any of the above-described monovalent substituents, but is preferably unsubstituted.

Examples of the metal atom for M include monovalent metal atoms such as lithium, sodium, potassium, and other alkali metal atoms; divalent metal atoms such as calcium and magnesium; and trivalent metal atoms such as aluminum and iron. Examples of the organic amine group for M include alkanolamine groups such as an ethanolamine group, a diethanolamine group, and a triethanolamine group; and alkylamine groups such as a triethylamine group.

More preferably, M is a metal atom. In order to more sufficiently provide the functions of a coat, the metal atom is still more preferably sodium or potassium. In order to provide a coat having better appearance improved by sufficiently enhancing the thermal foaming property of the fatty acid (salt), sodium is particularly preferred.

The fatty acid (salt) structure-containing compound is obtainable by a conventionally known method. For example, it is obtainable by the saponification method of saponifying an alkali solution with fats and/or oils and removing glycerol produced as a by-product. In addition, a commercial product of the fatty acid (salt) structure-containing compound may be used.

Examples of the fatty acid (salt) structure-containing compound include stearic acid, sodium stearate, potassium stearate, ammonium stearate, ethanolamine stearate, oleic acid, sodium oleate, potassium oleate, ammonium oleate, and ethanolamine oleate.

Examples of the commercial products of the fatty acid (salt) structure-containing compound include NS SOAP and OS SOAP (Kao Corporation).

In the vibration damping material resin composition of the second aspect of the invention, the total amount of the component having a sulfosuccinic acid (salt) structure and the component having a fatty acid (salt) structure is preferably 0.1% to 20% by mass relative to 100% by mass of the entire monomer component used to produce the emulsion. This feature is applicable as a preferred embodiment of the first aspect of the invention as described above. That is, in any of more preferred embodiments of the above-described vibration damping coating resin composition, in the vibration damping coating resin composition of the invention, the total amount of the component having a sulfosuccinic acid (salt) structure and the component having a fatty acid (salt) structure in the composition is 0.1% to 20% by mass relative to 100% by mass of the entire monomer component used to produce the emulsion. The total amount is more preferably 0.5% by mass or more, still more preferably 1% by mass or more. In order to provide a coat in which blisters and cracks are further prevented, the total amount is particularly preferably 2% by mass or more. The total amount is more preferably 15% by mass or less, still more preferably 10% by mass or less, further preferably 8% by mass or less, further more preferably 6% by mass or less, particularly preferably 4% by mass or less.

When the vibration damping coating resin composition of the first aspect of the invention or the vibration damping material resin composition of the second aspect of the invention contains either a component having a sulfosuccinic acid (salt) structure or a component having a fatty acid (salt) structure, the total amount of the component having a sulfosuccinic acid (salt) structure and the component having a fatty acid (salt) structure means the amount of the component contained. The same shall apply hereinbelow.

In order to obtain better effects of the second aspect of the invention, the vibration damping material resin composition of the second aspect of the invention particularly preferably contains at least a component having a sulfosuccinic acid (salt) structure. This feature is applicable as a preferred embodiment of the first aspect of the invention as described above. That is, in any of more preferred embodiments of the above-described vibration damping coating resin composition, the vibration damping coating resin composition of the invention contains a component having a sulfosuccinic acid (salt) structure.

The vibration damping material resin composition of the second aspect of the invention may contain an anionic surfactant other than the component having a sulfosuccinic acid (salt) structure and the component having a fatty acid (salt) structure. Preferably, the total amount of the component having a sulfosuccinic acid (salt) structure and the component having a fatty acid (salt) structure is 25% by mass or more in 100% by mass of an anionic surfactant in the composition. This feature is also applicable as a preferred embodiment of the first aspect of the invention. That is, in any of more preferred embodiments of the above-described vibration damping coating resin composition, the total amount of the component having a sulfosuccinic acid (salt) structure and the component having a fatty acid (salt) structure is 25% by mass or more in 100% by mass of an anionic surfactant in the composition. The total amount is more preferably 50% by mass or more, still more preferably 60% by mass or more, further preferably 70% by mass or more, further more preferably 80% by mass or more, particularly preferably 90% by mass or more, most preferably 100% by mass.

The anionic surfactant in the composition encompasses all the agents which can serve as an anionic surfactant in the composition, regardless of the purpose of use thereof. That is, the anionic surfactant in the composition may have a different function as long as it serves as an anionic surfactant. The anionic surfactant may be used as an emulsifier (e.g., emulsifier for use in emulsion polymerization), a dispersant, a wet penetrant, or a foaming agent, for example.

When the anionic surfactant is used as an emulsifier for emulsion polymerization, the anionic surfactant may be present as a usual emulsifier (in the form of a compound different from the polymer that forms the emulsion) or may be present both as an emulsifier and in the form of a constituent unit that is part of the polymer that forms the emulsion.

Examples of the anionic surfactant other than the component having a sulfosuccinic acid (salt) structure and the component having a fatty acid (salt) structure include those disclosed in JP 5030780 B and JP 2014-52024 A. Examples of the anionic surfactant include, as described above, alkylbenzene sulfonic acids (and salts thereof) such as NEOPELEX G-65 (trade name, sodium dodecylbenzenesulfonate, Kao Corporation); polyoxyalkylene alkyl ether sulfates such as LEVENOL WX (trade name, sodium polyoxyethylene alkyl ether sulfate, Kao Corporation); polyoxyalkylene polycyclic phenyl ether sulfates such as NEWCOL 707SF (trade name, polyoxyethylene polycyclic phenyl ether sulfate, Nippon Nyukazai Co., Ltd.); alkyl diphenyl ether disulfonates; and other common anionic emulsifiers (e.g., sodium lauryl sulfate). One or two or more of these may be used.

The vibration damping coating resin composition of the first aspect of the invention or the vibration damping material resin composition of the second aspect of the invention may further contain an emulsifier other than the anionic surfactants as described above. The emulsifier other than the anionic surfactants may be the emulsifier disclosed in JP 2014-52024 A, for example.

The total amount of the component having a sulfosuccinic acid (salt) structure and the component having a fatty acid (salt) structure in the vibration damping coating resin composition of the first aspect of the invention or the vibration damping material resin composition of the second aspect of the invention including the amount of the components in the form of a constituent unit of the polymer that forms the emulsion can be calculated as the sum of the amounts of all the sulfosuccinic acid (salt) structure-containing compound(s) and fatty acid (salt) structure-containing compound(s) used to produce the composition. Alternatively, the total amount of the components can also be calculated as the sum of the amounts of the sulfosuccinic acid (salt) structure-containing compound(s), the fatty acid (salt) structure-containing compound(s), the constituent unit derived from a sulfosuccinic acid (salt) structure-containing compound in the polymer that forms the emulsion, and the constituent unit derived from a fatty acid (salt) structure-containing compound in the polymer that forms the emulsion in the vibration damping coating resin composition of the first aspect of the invention or the vibration damping material resin composition of the second aspect of the invention.

Further, it is preferred that a preferred total amount of the sulfosuccinic acid (salt) structure-containing compound(s) and the fatty acid (salt) structure-containing compound(s) in the vibration damping coating resin composition of the first aspect of the invention or the vibration damping material resin composition of the second aspect of the invention falls within the above-described range of the total amount of the component having a sulfosuccinic acid (salt) structure and the component having a fatty acid (salt) structure. In this preferred embodiment, the vibration damping coating resin composition of the first aspect of the invention or the vibration damping material resin composition of the second aspect of the invention may contain a component having a sulfosuccinic acid (salt) structure and/or a component having a fatty acid (salt) structure in the form of a constituent unit of the polymer that forms the emulsion in addition to the sulfosuccinic acid (salt) structure-containing compound and/or fatty acid (salt) structure-containing compound.

The total amount of the sulfosuccinic acid (salt) structure-containing compound and fatty acid (salt) structure-containing compound in the vibration damping coating resin composition of the first aspect of the invention or the vibration damping material resin composition of the second aspect of the invention may be determined by high-performance liquid chromatograph analysis of the components extracted from the heat-dried coat. This method is capable of analyzing the components not in the form of the constituent unit of the polymer that forms the emulsion even when the sulfosuccinic acid (salt) structure-containing compound or the fatty acid (salt) structure-containing compound having a reactive unsaturated carbon-carbon bond is used in polymerization.

(Other Features)

The vibration damping coating resin composition of the invention may have any pH, and it preferably has a pH of 2 to 10, more preferably 3 to 9.5, still more preferably 7 to 9. The pH of the vibration damping coating resin composition of the invention can be controlled by adding ammonia water, a water-soluble amine, or an aqueous alkali hydroxide solution, for example, to the resin.

The pH herein can be measured by the method disclosed in the below described examples.

The vibration damping coating resin composition of the invention may have any viscosity, and it preferably has a viscosity of 1 to 10000 mPa·s, more preferably 5 to 4000 mPa·s, still more preferably 10 to 2000 mPa·s, further preferably 30 to 1000 mPa·s, particularly preferably 80 to 500 mPa·s.

The viscosity herein can be measured under the conditions disclosed in the below described examples.

The vibration damping coating resin composition of the invention can be produced by the same method as the method for producing an emulsion for vibration damping materials disclosed in JP 2011-231184 A, for example. The emulsion particle may be produced by a method other than emulsion polymerization. For example, the emulsion particle may be formed by allowing an emulsifier to act on the polymer produced by suspension polymerization.

The vibration damping coating resin composition of the invention contains the emulsion particle in the invention and may optionally contain a surfactant component such as an anionic surfactant component and a different component.

The proportion of the different component, if present, is preferably 10% by mass or less, more preferably 5% by mass or less of the entire vibration damping coating resin composition of the invention. The different component herein includes nonvolatile components (solids) left in a coat obtained by applying the vibration damping material resin composition of the invention and heat-drying the composition, excluding volatile components such as aqueous solvents.

The vibration damping coating resin composition of the invention contains an aqueous solvent, and the emulsion particles are preferably dispersed in the aqueous solvent. The phrase "dispersed in the aqueous solvent" herein means that the emulsion particles are not dissolved but dispersed in the aqueous solvent.

The solid content of the vibration damping coating resin composition of the invention is preferably 10% to 90% by mass, more preferably 40% to 80% by mass, still more preferably 50% to 70% by mass. The solid content of the vibration damping coating resin composition of the invention can be controlled using an aqueous solvent to fall within the above-described ranges.

Herein, the aqueous solvent may contain an organic solvent as long as the aqueous solvent contains water. The aqueous solvent is preferably water.

The vibration damping coating resin composition of the invention itself may be applied to form a vibration damping coat. Usually, it is used to obtain the below described coating of the invention.

The vibration damping coating resin composition of the invention may be produced by preparing an emulsion of a composite of two or more polymer chains through a series of production steps, for example, by multistage polymerization of a monomer component as described below. The emulsion of a composite of two or more polymer chains is obtained by multistage polymerization in which the production conditions in each polymerization step, such as a condition of dropwise addition of the monomers, are appropriately set. Each polymerization step is preferably emulsion polymerization as described below. For example, the vibration damping coating resin composition containing a two-layer core-shell emulsion particle of a composite of two polymer chains may be produced by any method. Suitably, it is produced by two-stage emulsion polymerization in which a core is formed in the first stage and a shell is formed on the core by emulsion polymerization in the second stage.

<Method for Producing Vibration Damping Coating Resin Composition of the Invention>

The invention also relates to a method for producing the vibration damping coating resin composition containing an emulsion particle having a multilayer structure, the method including: polymerizing a monomer component to form an inner layer; and polymerizing 1% to 30% by mass of a monomer component in 100% by mass of an entire monomer component used to produce an emulsion particle to form an outermost layer formed from a resin having a glass transition temperature of 60° C. or higher.

The inner layer can be formed by polymerization such as emulsion polymerization of a monomer component containing the above-described copolymerizable unsaturated monomer such as a (meth)acrylic acid monomer.

In any of more preferred embodiments of the above-described production method, the inner layer is formed from a resin having a glass transition temperature of −30° C. to 40° C.

In any of more preferred embodiments of the above-described production method, the inner layer is formed from a resin having a glass transition temperature of −15° C. or higher.

In any of more preferred embodiments of the above-described production method, the inner layer is formed from a resin having a glass transition temperature of −10° C. or higher.

In any of more preferred embodiments of the above-described production method, the inner layer is formed from a resin having a glass transition temperature of 35° C. or lower.

The production method of the invention may include multiple steps for forming an inner layer. In this case, at least one of the steps for forming an inner layer preferably provides an inner layer satisfying the preferred condition of the glass transition temperature. More preferably, the respective steps for forming an inner layer provide an inner layer satisfying the preferred condition of the glass transition temperature.

The outermost layer can be formed by polymerization such as emulsion polymerization of a monomer component containing the above-described copolymerizable unsaturated monomer such as a (meth)acrylic acid monomer with a composition capable of providing a resin having a glass transition temperature of 60° C. or higher.

In any of more preferred embodiments of the above-described production method, the glass transition temperature of the resin forming the outermost layer is higher than the glass transition temperature of the resin forming the inner layer by 10° C. or more.

In any of more preferred embodiments of the above-described production method, the glass transition temperature of the resin forming the outermost layer is higher than the glass transition temperature of the resin forming the inner layer by 30° C. or more.

In any of more preferred embodiments of the above-described production method, the glass transition temperature of the resin forming the outermost layer is higher than the glass transition temperature of the resin forming the inner layer by 80° C. or more.

In the production method of the invention, the emulsion particle having a multilayer structure may be obtained by the formation of an inner layer and the formation of an outermost layer.

In any of more preferred embodiments of the above-described production method, the emulsion particle contains a (meth)acrylic polymer.

In any of more preferred embodiments of the above-described production method, the composition contains a component having a sulfosuccinic acid (salt) structure and/or a component having a fatty acid (salt) structure.

In any of more preferred embodiments of the above-described production method, the composition contains a component having a sulfosuccinic acid (salt) structure.

In any of more preferred embodiments of the above-described production method, the total amount of the component having a sulfosuccinic acid (salt) structure and the component having a fatty acid (salt) structure is 25% by mass or more in 100% by mass of an anionic surfactant in the composition.

In any of more preferred embodiments of the above-described production method, the total amount of the component having a sulfosuccinic acid (salt) structure and the component having a fatty acid (salt) structure is 50% by mass or more in 100% by mass of the anionic surfactant in the composition.

In any of more preferred embodiments of the above-described production method, the total amount of the component having a sulfosuccinic acid (salt) structure and the component having a fatty acid (salt) structure in the composition is 0.1% to 20% by mass relative to 100% by mass of the entire monomer component used to produce the emulsion.

The second aspect of the invention also relates to a method for producing the vibration damping material resin composition containing an emulsion particle having a multilayer structure, and the production method includes polymerization of a monomer component to form an inner layer formed from a resin having a glass transition temperature of −10° C. to 35° C. and polymerization of a monomer component to form an outermost layer formed from a resin having a glass transition temperature higher than that of the resin forming the inner layer by 10° C. or more, wherein the vibration damping material resin composition contains a component having a sulfosuccinic acid (salt) structure and/or a component having a fatty acid (salt) structure.

The above-described formation of the inner layer may include polymerization such as emulsion polymerization of the monomer component containing the above-described copolymerizable unsaturated monomer such as a (meth) acrylic acid monomer, having a composition that provides a resin having a glass transition temperature of −10° C. to 35° C.

The above-described formation of the outermost layer may include polymerization such as emulsion polymerization of the monomer component containing the above-described copolymerizable unsaturated monomer such as a (meth)acrylic acid monomer, having a composition that provides a resin having a glass transition temperature higher than that of the resin forming the inner layer by 10° C. or more.

The inner layer and the outermost layer each may be formed by (1) emulsion polymerization of a monomer emulsion containing a surfactant such as an anionic surfactant (hereinafter, also referred to as "a surfactant") and a monomer component as a starting material, (2) emulsion polymerization of a monomer emulsion containing part of a surfactant and a monomer component as a starting material to prepare an emulsion and addition of the rest of the surfactant to the resulting emulsion, (3) polymerization other than emulsion polymerization to prepare a polymer and addition of a surfactant as an emulsifier to the resulting polymer, or (4) emulsion polymerization of a monomer component not containing a surfactant to prepare an emulsion and addition of a surfactant to the resulting emulsion. Preferred among these are the processes (1) to (3) in which a surfactant serves as an emulsifier.

The polymerization temperatures for forming the inner layer and the outermost layer may be any temperature, preferably 0° C. to 100° C., more preferably 30° C. to 80° C., for example. The polymerization times may be any time, preferably 0.1 to 15 hours, more preferably 1 to 10 hours, for example.

<Coating of the Invention>

The invention also relates to a coating (vibration damping coating or paint-type vibration damping material) containing the vibration damping coating resin composition of the invention and a pigment. Hereinafter, the invention according to the coating is also referred to as the first aspect of the invention.

A preferred vibration damping coating resin composition contained in the coating of the invention is the same as a preferred one of the above-described preferred vibration damping coating resin composition of the invention.

The invention also relates to a coating (vibration damping coating or paint-type vibration damping material) containing the vibration damping material resin composition of the invention and a pigment. Hereinafter, the invention according to the coating is also referred to as the second aspect of the invention.

A preferred vibration damping material resin composition contained in the coating of the invention is the same as a preferred one of the above-described preferred vibration damping material resin composition of the invention.

The following descriptions of the coating of the invention are common to the coatings of the first and second aspects of the invention unless otherwise stated.

The amount of the solids content of the composition is preferably 1% by mass or more, more preferably 5% by mass or more, still more preferably 10% by mass or more in 100% by mass of the solids of the coating of the invention. The amount of the solids content of the composition is preferably 50% by mass or less, more preferably 40% by mass or less, still more preferably 30% by mass or less.

Examples of the pigment include inorganic colorants, organic colorants, antirust pigments, and fillers. One or two or more of these may be used. Examples of the inorganic colorants include titanium oxide, carbon black, and colcothar. Examples of the organic colorants include dyes and natural colorants. Examples of the antirust pigments include metal phosphates, metal molybdates, and metal borates. Examples of the fillers include inorganic fillers such as calcium carbonate, kaolin, silica, talc, barium sulfate, alumina, iron oxide, glass powder, magnesium carbonate, aluminum hydroxide, diatomaceous earth, and clay; flaky fillers such as glass flakes and mica; and fibrous fillers such as metal oxide whiskers, glass fibers, and wollastonites. The pigment is preferably an inorganic colorant, an antirust pigment, or a filler, more preferably an inorganic filler, still more preferably calcium carbonate.

The pigment preferably has an average particle size of 1 to 50 µm. The average particle size of the pigment can be measured with a laser diffraction particle size distribution analyzer, and is a value of the particle size at which the weight according to the particle size distribution reaches 50%.

The amount of the pigment is preferably 10 parts by mass or more, more preferably 100 parts by mass or more, still more preferably 200 parts by mass or more, particularly preferably 300 parts by mass or more relative to 100 parts by mass of the solids of the resin in the coating of the invention (the entire monomer component used to produce the emulsion particle). The amount is preferably 900 parts by mass or less, more preferably 800 parts by mass or less, still more preferably 500 parts by mass or less.

The coating of the invention may further contain a dispersant.

Examples of the dispersant include inorganic dispersants such as sodium hexametaphosphate and sodium tripolyphosphate and organic dispersants such as polycarboxylic acid-based dispersants.

The amount of the solids content of the dispersant is preferably 0.1 to 8 parts by mass, more preferably 0.5 to 6 parts by mass, still more preferably 1 to 3 parts by mass relative to 100 parts by mass of the solids of the resin in the coating of the invention.

The coating of the invention may further contain a thickener.

Examples of the thickener include polyvinyl alcohol, cellulose derivatives, and polycarboxylic acid resins.

The amount of the solids content of the thickener is preferably 0.01 to 5 parts by mass, more preferably 0.1 to 4 parts by mass, still more preferably 0.3 to 2 parts by mass relative to 100 parts by mass of the solids of the resin in the coating of the invention.

The coating of the invention may further contain a different component. Examples of the different component include foaming agents, solvents, gelling agents, defoaming agents, plasticizers, stabilizers, wetting agents, antiseptic agents, foaming inhibitors, antioxidants, mildew-proofing agents, ultraviolet absorbers, and antistatic agents. One or two or more of these may be used.

The pigment, dispersant, thickener, and different component may be mixed with the emulsion particle in the invention and a cross-linking agent, for example, using a butterfly mixer, planetary mixer, spiral mixer, kneader, or dissolver.

Examples of the solvent include water and organic solvents such as ethylene glycol, butyl cellosolve, butyl carbitol, and butyl carbitol acetate. The amount of the solvent may be appropriately set to adjust the solid concentration of the coating of the invention.

When a coat is prepared from the coating of the invention, particularly when a coat is prepared by heat-drying the coating of the second aspect of the invention, the coating is foamed while simultaneously dried, so that a path for evaporation of a solvent such as water can be formed. As a result, the emulsion particle according to the second aspect of the invention including an outermost layer formed from a resin having a specific high glass transition temperature can provide a coat having an excellent drying property and very good appearance in which sagging due to heat during its formation and blisters are prevented. Furthermore, since the component having a sulfosuccinic acid (salt) structure serves as a foaming agent, the amount of a commonly used costly foaming agent (e.g., thermally expandable encapsulated foaming agent) can be reduced. For example, the amount of the thermally expandable encapsulated foaming agent in the coating of the second aspect of the invention is preferably 2% by mass or less, more preferably 1% by mass or less, most preferably 0% by mass relative to 100% by mass of the entire monomer component used to produce the emulsion.

In the coating of the second aspect of the invention containing the component having a sulfosuccinic acid (salt) structure and/or the component having a fatty acid (salt) structure serving as a foaming agent, the amount of the thermally expandable encapsulated foaming agent can be reduced to 2% by mass or less or a much smaller amount. Thereby, deformation of the coat caused by an excessive amount of the foaming agent can be sufficiently prevented. Thus, the coating can provide a coat having better appearance.

Accordingly, the coating of the second aspect of the invention can provide a coat having excellent appearance even when it has an inexpensive formulation as described above containing a large amount of a pigment such as calcium carbonate and a reduced amount of a thermally expandable encapsulated foaming agent, for example. In addition, the coating of the second aspect of the invention having such a formulation can impart an excellent vibration damping property.

The coating of the invention preferably has a total loss coefficient determined by the method described in the below described examples of 0.348 or higher, more preferably 0.400 or higher, still more preferably 0.410 or higher, further preferably 0.440 or higher, further more preferably 0.450 or higher, particularly preferably 0.460 or higher.

It is a preferred embodiment of the coating of the invention that the coating contains 10% by mass or more of the pigment relative to 100% by mass of the entire monomer component used to produce the emulsion particle and has a total loss coefficient of 0.348 or higher, for example.

Also, it is a preferred embodiment of the coating of the second aspect of the invention that the coating contains 10% by mass or more of the pigment relative to 100% by mass of the entire monomer component used to produce the emulsion and 2% by mass or less of the thermally expandable encapsulated foaming agent and has a total loss coefficient of 0.348 or higher, for example.

The total loss coefficient is determined by the method described in the below described examples.

The coating of the invention is suitable for transportation means such as vehicles, railway vehicles, ships, and aircraft, electric devices, buildings, and construction machinery. For example, the coating is preferably a coating for vehicles.

<Coat of the Invention and Method for Producing the Same>

The invention also relates to a coat (vibration damping coat) obtainable from the coating of the first aspect of the invention. Hereinafter, the invention according to the coat is also referred to as the first aspect of the invention.

A preferred coating of the coat of the first aspect of the invention is the same as a preferred one of the above-described preferred coating of the first aspect of the invention.

The invention also relates to a coat (vibration damping coat) obtainable from the coating of the second aspect of the invention. Hereinafter, the invention according to the coat is also referred to as the second aspect of the invention.

A preferred coating of the coat of the second aspect of the invention is the same as a preferred one of the above-described preferred coating of the second aspect of the invention.

The first aspect of the invention also relates to a method for producing a coat, the method including forming an inner layer and forming an outermost layer to prepare an emulsion particle from a monomer component, mixing the monomer component and/or the emulsion particle with a pigment to prepare a coating, and curing the coating to provide a coat.

The second aspect of the invention also relates to a method for producing a coat, the method including foaming a coating containing an emulsion prepared by polymerization of a monomer component, a component having a sulfosuccinic acid (salt) structure and/or a component having a fatty acid (salt) structure, and a pigment by heating the coating to provide a coat.

The preferred embodiments of the coat of the invention described below are common to the coats of the first and second aspects of the invention unless otherwise stated.

The coat of the invention preferably has a thickness of 0.5 to 8 mm. In order to provide a better coat which exhibits a more sufficient vibration damping property and in which defects such as peeling and cracks are more sufficiently prevented, such a thickness is preferred. The thickness of the coat is more preferably 1 to 6 mm, still more preferably 2 to 5 mm.

The coat of the invention may be formed on any substrate on which the coat can be formed. The substrate may be made of a plastic material or a metal material such as a steel plate, for example. In particular, to form a coat on the surface of a steel plate is also one preferred embodiment of the use of the coat of the invention. Also, owing to the property of the coating material of the invention capable of preventing sagging due to heat, to form a coat on a vertical or inclined surface is also one preferred embodiment of the use of the coat of the invention.

The coat of the invention is obtainable by applying the coating of the invention using brush, spatula, air spray, airless spray, mortar gun, or texture gun, for example.

The coat of the invention is preferably obtainable by heat-drying the coating of the invention applied to a substrate. The coat of the second aspect of the invention is preferably obtainable by foaming the coating of the second aspect of the invention applied to a substrate by heat-drying. Here, since the coating is foamed by heat-drying, the component having a sulfosuccinic acid (salt) structure is usually not mechanically foamed by stirring the coating before heat-drying, for example. The coat formed by applying the coating to a substrate is preferably heat-dried at 40° C. to 200° C., more preferably 90° C. to 180° C., still more preferably 100° C. to 160° C. Before heat-drying, the coating may be pre-dried at a low temperature. The coat is heated at the temperature for preferably 1 to 300 minutes, more preferably 2 to 250 minutes, particularly preferably 10 to 150 minutes.

The vibration damping property of the coat of the invention can be evaluated by measuring the loss coefficient of the coat.

The loss coefficient is usually represented by η and indicates the degree of attenuation of vibration applied to the coat.

A higher loss coefficient indicates a better vibration damping property.

The loss coefficient can be measured by the method disclosed in the below described examples.

The coat of the invention has excellent appearance and can exhibit a significantly excellent vibration damping property in a temperature range of a use environment of vibration damping materials, and can be suitable for transportation means such as vehicles, railway vehicles, ships, and aircraft, electric devices, buildings, and construction machinery.

Advantageous Effects of Invention

The vibration damping coating resin composition of the first aspect of the invention containing an emulsion particle having a specific multilayer structure can suitably provide a coat having excellent appearance and exhibiting a significantly excellent vibration damping property at a desired temperature in a temperature range of a use environment of vibration damping materials, for example. The vibration damping material resin composition of the second aspect of the invention containing an emulsion particle having a specific multilayer structure and a component having a sulfosuccinic acid (salt) structure and/or a component having a fatty acid (salt) structure can suitably provide a coat having excellent appearance and exhibiting a significantly excellent vibration damping property in a temperature range of a use environment of vibration damping materials.

BRIEF DESCRIPTION OF DRAWINGS

FIG. 1 is a schematic side view of a test plate used in the evaluation test of the thermal softening property of a coat on a vertical surface.

EXAMPLES

The following description is offered to demonstrate the invention based on embodiments of the invention. The embodiments should not be construed as limiting the invention. Unless otherwise mentioned, the term "part(s)" means "part(s) by weight" and "%" means "% by mass". The inner layer(s) and the outermost layer of an emulsion particle are also referred to as a core(s) and a shell, respectively.

The properties were evaluated as follows in the production examples.
<Average Particle Size>
The average particle size of emulsion particles was measured by dynamic light scattering using a particle size distribution analyzer (FPAR-1000, Otsuka Electronics Co., Ltd.).
<Nonvolatile Content (N.V.)>
About 1 g of the resulting emulsion was weighed and dried in a hot air dryer at 150° C. for one hour. The amount of the residue after drying was measured as the nonvolatile content and expressed as a ratio (% by mass) to the mass of the emulsion before drying.
<pH>
The pH at 25° C. was measured using a pH meter ("F-23", Horiba, Ltd.).
<Viscosity>
The viscosity was measured at 25° C. and 20 rpm using a B-type rotary viscometer ("VISCOMETER TUB-10", Toki Sangyo Co., Ltd.).
<Weight Average Molecular Weight>
The weight average molecular weight was measured by gel permeation chromatography (GPC) under the following conditions.
Measuring equipment: HLC-8120GPC (trade name, Tosoh Corporation)
Molecular-weight column: TSK-GEL GMHXL-L and TSK-GEL G5000HXL (both produced by Tosoh Corporation) connected in series
Eluent: Tetrahydrofuran (THF)
Calibration curve reference material: Polystyrene (Tosoh Corporation)
Measuring method: A measurement object was dissolved in THF to about 0.2% by mass in terms of solid content, and passed through a filter to obtain a filtrate as a sample to be measured. The molecular weight of the filtrate was measured.
<Glass Transition Temperature (Tg) of Polymer>
The Tg of the polymer was determined from the following equation (1) based on the compositions of the monomers used in the respective stages.

$$\frac{1}{Tg'} = \left[ \frac{W_1'}{T_1} + \frac{W_2'}{T_2} + \ldots + \frac{W_n'}{T_n} \right] \quad (1)$$

In the equation, Tg' represents Tg (absolute temperature) of the polymer; $W_1'$, $W_2'$, ..., and $W_n'$ each represent the mass fraction of each monomer relative to the entire monomer component; and $T_1$, $T_2$, . . . , and $T_n$, each represent the glass transition temperature (absolute temperature) of the homopolymer of each monomer.

The Tg determined from the compositions of the monomers in all the stages was expressed as "total Tg".

The following shows the glass transition temperatures (Tgs) of the homopolymers of the respective polymerizable monomers which were used to calculate the Tg based on the equation (1).
Methyl methacrylate (MMA): 105° C.
Styrene (St): 100° C.
2-Ethylhexyl acrylate (2EHA): −70° C.
Butyl acrylate (BA): −56° C.
Acrylic acid (AA): 95° C.
Isobornyl methacrylate (IBMA): 180° C.
Acrylamide (AAM): 165° C.
Butyl methacrylate (BMA): 20° C.

1. Examples of the First Aspect of the Invention

The following describes the surfactants used in the below-described examples of the first aspect of the invention.

A polyoxyethylene alkyl ether-sulfosuccinic acid half ester salt is a compound represented by the following formula (i):

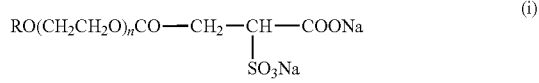

wherein R represents a C12-C14 secondary alkyl group and n represents the average number of moles added.

Herein, the compound in which n=9 is referred to as a compound (i)-<1a>.

The following describes commercially available surfactants used in the examples and comparative examples.

HITENOL NF-08 (trade name, ammonium polyoxyethylene styrenated phenyl ether sulfate, Dai-Ichi Kogyo Seiyaku Co., Ltd.)

NEOPELEX G-65 (trade name, sodium dodecyl benzene sulfonate, Kao Corporation)

Example 1-1

A polymerization vessel equipped with a stirrer, a reflux condenser, a thermometer, a nitrogen inlet tube, and a dropping funnel was charged with 289.8 parts of deionized water. Then, the internal temperature was increased to 75° C. under stirring and nitrogen flow. Separately, the dropping funnel was charged with a monomer emulsion including 450.0 parts of styrene, 316.0 parts of 2-ethylhexyl acrylate, 125.0 parts of butyl acrylate, 9.0 parts of acrylic acid, 3.0 parts of t-dodecyl mercaptan (also referred to as t-DM) serving as a polymerization chain transfer agent, 135.0 parts of a 20% aqueous solution of HITENOL NF-08 (Dai-Ichi Kogyo Seiyaku Co., Ltd.) prepared in advance, and 189.0 parts of deionized water. Then, a 24.0-part portion of the monomer emulsion, 5 parts of a 5% aqueous solution of potassium persulfate serving as a polymerization initiator (oxidant), and 10 parts of a 2% aqueous solution of sodium bisulfite were added to the polymerization vessel with the internal temperature thereof being maintained at 75° C. to start initial polymerization. After 40 minutes, the rest of the monomer emulsion was uniformly added dropwise over 180 minutes with the reaction system being maintained at 80° C. Simultaneously therewith, 70 parts of a 5% aqueous solution of potassium persulfate and 70 parts of a 2% aqueous solution of sodium bisulfite were uniformly added dropwise over 180 minutes. After completion of the dropwise addition, the temperature was maintained for 60 minutes. This gave an aqueous dispersion of an acrylic copolymer having a glass transition temperature of −5° C. forming the core of an emulsion particle having a multilayer structure.

Then, the dropping funnel was charged with a monomer emulsion including 70.0 parts of styrene and 30.0 parts of isobornyl methacrylate as monomers for forming the shell, 0.3 parts of t-DM, 15.0 parts of a 20% aqueous solution of HITENOL NF-08 (Dai-Ichi Kogyo Seiyaku Co., Ltd.) prepared in advance, and 21.0 parts of deionized water. The monomer emulsion was uniformly added dropwise over 40 minutes to the aqueous acrylic copolymer dispersion prepared as described above. Simultaneously therewith, 25 parts of a 5% aqueous solution of potassium persulfate and 20 parts of a 2% aqueous solution of sodium bisulfite were uniformly added dropwise over 40 minutes. After completion of the dropwise addition, the temperature was maintained for 120 minutes to form the shell having a glass transition temperature of 120° C. The resulting reaction solution was cooled to room temperature, and 16.7 parts of 2-dimethyl ethanolamine was added thereto. This gave an acrylic emulsion (resin composition 1-1) having a nonvolatile content of 55.0%, a pH of 8.6, a viscosity of 250 mPa·s, an average particle size of 180 nm, and a weight average molecular weight of 70000.

Examples 1-2 to 1-4

Acrylic emulsions (resin compositions 1-2 to 1-4) were obtained as in Example 1-1, except that the ingredients added were changed as shown in Table 1 below.

Example 1-5

The core of an emulsion particle was produced as in Example 1-1, except that the ingredients of the monomer emulsion for forming the core of an emulsion particle in Example 1-1 were changed as follows: the amount of styrene was changed from 450.0 parts to 460.0 parts, the amount of 2-ethylhexyl acrylate was changed from 316.0 parts to 326.0 parts, the amount of butyl acrylate was changed from 125.0 parts to 155.0 parts, the amount of the 20% aqueous solution of HITENOL NF-08 (Dai-Ichi Kogyo Seiyaku Co., Ltd.) prepared in advance was changed from 135.0 parts to 144.0 parts, and the amount of deionized water was changed from 189.0 parts to 198.3 parts; and the amount of the 5% aqueous solution of potassium persulfate and the amount of the 2% aqueous solution of sodium bisulfite which began to be added dropwise simultaneously with the rest of the monomer emulsion were changed from 70 parts to 85 parts and from 70 parts to 80 parts, respectively. This gave an aqueous dispersion of an acrylic copolymer having a glass transition temperature of −8° C.

Then, the shell of an emulsion particle was produced as in Example 1-1, except that the ingredients of the monomer emulsion for forming the shell of an emulsion particle in Example 1-1 were changed as follows: 38.0 parts of methyl methacrylate was used instead of 70.0 parts of styrene, the amount of isobornyl methacrylate was changed from 30.0 parts to 12.0 parts, the amount of the 20% aqueous solution of HITENOL NF-08 (Dai-Ichi Kogyo Seiyaku Co., Ltd.) prepared in advance was changed from 15.0 parts to 6.0 parts, and the amount of deionized water was changed from 21.0 parts to 11.7 parts; and the amount of the 5% aqueous solution of potassium persulfate and the amount of the 2% aqueous solution of sodium bisulfite which began to be added dropwise simultaneously with the monomer emulsion were changed from 25 parts to 10 parts and from 20 parts to 10 parts, respectively. Thus, the shell having a glass transition temperature of 120° C. was obtained. Thereafter, the subsequent procedures were performed as in Example 1-1 to obtain an acrylic emulsion (resin composition 1-5) having a nonvolatile content of 55.0%, a pH of 8.5, a viscosity of 290 mPa·s, an average particle size of 170 nm, and a weight average molecular weight of 72000.

Example 1-6

The core of an emulsion particle was produced as in Example 1-1, except that the ingredients of the monomer emulsion for forming the core of an emulsion particle in Example 1-1 were changed as follows: the amount of styrene was changed from 450.0 parts to 350.0 parts, the amount of 2-ethylhexyl acrylate was changed from 316.0 parts to 256.0 parts, the amount of butyl acrylate was changed from 125.0 parts to 85.0 parts, 105.0 parts of a 20% aqueous solution of the compound (i)-<1a>prepared in advance was used instead of 135.0 parts of the 20% aqueous solution of HITENOL NF-08 (Dai-Ichi Kogyo Seiyaku Co., Ltd.) prepared in advance, and the amount of deionized water was changed from 189.0 parts to 147.0 parts; and the amount of the 5% aqueous solution of potassium persulfate and the amount of the 2% aqueous solution of sodium bisulfite which began to be added dropwise simultaneously with the rest of the monomer emulsion were changed from 70 parts to 60 parts and from 70 parts to 60 parts, respectively. This gave an aqueous dispersion of an acrylic copolymer having a glass transition temperature of −5° C.

Then, the shell of an emulsion particle was produced as in Example 1-1, except that the ingredients of the monomer emulsion for forming the shell of an emulsion particle in Example 1-1 were changed as follows: 295.0 parts of methyl methacrylate and 5.0 parts of acrylic acid were used instead of 70.0 parts of styrene and 30.0 parts of isobornyl methacrylate, 45.0 parts of a 20% aqueous solution of the compound (i)-<1a>prepared in advance was used instead of 15.0 parts of the 20% aqueous solution of HITENOL NF-08 (Dai-Ichi Kogyo Seiyaku Co., Ltd.) prepared in advance, and the amount of deionized water was changed from 21.0 parts to 63.0 parts; the amount of the 5% aqueous solution of potassium persulfate and the amount of the 2% aqueous solution of sodium bisulfite which began to be added dropwise simultaneously with the monomer emulsion were changed from 25 parts to 35 parts and from 20 parts to 30 parts, respectively; and the dropwise addition time of these aqueous solutions were changed from 40 minutes to 60 minutes. Thus, the shell having a glass transition temperature of 105° C. was obtained. Thereafter, the subsequent procedures were performed as in Example 1-1 to obtain an acrylic emulsion (resin composition 1-6) having a nonvolatile content of 54.8%, a pH of 8.6, a viscosity of 320 mPa·s, an average particle size of 160 nm, and a weight average molecular weight of 74000.

Examples 1-7 and 1-8

Acrylic emulsions (resin compositions 1-7 and 1-8) were obtained as in Example 1-1, except that the ingredients added were changed as shown in Table 1 below, and in Example 1-7, 25% ammonia water was added in an amount that gave the acrylic emulsion with a pH of 8.5 instead of 2-dimethyl ethanolamine, and in Example 1-8, no 2-dimethyl ethanolamine was added (no neutralizer was added).

Comparative Example 1-1

An acrylic emulsion (resin composition 1-9) was obtained as in Example 1-1, except that the ingredients added were changed as shown in Table 1 below.

Comparative Example 1-2

The core of an emulsion particle was produced as in Example 1-1, except that the ingredients of the monomer emulsion for forming the core of an emulsion particle in Example 1-1 were changed as follows: the amount of styrene was changed from 450.0 parts to 136.0 parts, the amount of 2-ethylhexyl acrylate was changed from 316.0 parts to 55.0 parts, the amount of butyl acrylate was changed from 125.0 parts to 100.0 parts, the amount of t-DM was changed from 3.0 parts to 1.0 part, 45.0 parts of a 20% aqueous solution of NEOPELEX G-65 (Kao Corporation) prepared in advance was used instead of 135.0 parts of the 20% aqueous solution of HITENOL NF-08 (Dai-Ichi Kogyo Seiyaku Co., Ltd.) prepared in advance, and the amount of deionized water was changed from 189.0 parts to 63.0 parts; the dropwise addition time of the rest of the monomer emulsion was changed from 180 minutes to 120 minutes; and the amount of the 5% aqueous solution of potassium persulfate and the amount of the 2% aqueous solution of sodium bisulfite which began to be added dropwise simultaneously with the rest of the monomer emulsion were changed from 70 parts to 35 parts and from 70 parts to 30 parts, respectively. This gave an aqueous dispersion of an acrylic copolymer having a glass transition temperature of −5° C.

Then, the shell of an emulsion particle was produced as in Example 1-1, except that the ingredients of the monomer emulsion for forming the shell of an emulsion particle in Example 1-1 were changed as follows: 650.0 parts of methyl methacrylate was used instead of 70.0 parts of styrene, the amount of isobornyl methacrylate was changed from 30.0 parts to 50.0 parts, the amount of t-DM was changed from 0.3 parts to 2.0 parts, 105.0 parts of a 20% aqueous solution of NEOPELEX G-65 (Kao Corporation) prepared in advance was used instead of 15.0 parts of the 20% aqueous solution of HITENOL NF-08 (Dai-Ichi Kogyo Seiyaku Co., Ltd.) prepared in advance, and the amount of deionized water was changed from 189.0 parts to 147.0 parts; the amount of the 5% aqueous solution of potassium persulfate and the amount of the 2% aqueous solution of sodium bisulfite which began to be added dropwise simultaneously with the monomer emulsion were changed from 25 parts to 60 parts and from 20 parts to 60 parts, respectively; and the dropwise addition time of these aqueous solutions was changed from 40 minutes to 180 minutes. Thus, the shell having a glass transition temperature of 110° C. was obtained. Thereafter, the subsequent procedures were performed as in Example 1-1 to obtain an acrylic emulsion (resin composition 1-10) having a nonvolatile content of 55.1%, a pH of 8.6, a viscosity of 170 mPa·s, an average particle size of 250 nm, and a weight average molecular weight of 65000.

Comparative Example 1-3

A polymerization vessel equipped with a stirrer, a reflux condenser, a thermometer, a nitrogen inlet tube, and a dropping funnel was charged with 310.4 parts of deionized water. Then, the internal temperature was increased to 75° C. under stirring and nitrogen flow. Separately, the dropping funnel was charged with a monomer emulsion including 560 parts of styrene, 270 parts of 2-ethylhexyl acrylate, 150 parts of butyl acrylate, 20.0 parts of acrylic acid, 3.0 parts of t-DM, 150.0 parts of a 20% aqueous solution of NEOPELEX G-65 (Kao Corporation) prepared in advance, and 210.0 parts of deionized water. Then, a 27.0-part portion of the monomer emulsion, 5 parts of a 5% aqueous solution of potassium persulfate serving as a polymerization initiator (oxidant), and 10 parts of a 2% aqueous solution of sodium bisulfite were added to the polymerization vessel with the internal temperature thereof being maintained at 75° C. to start initial polymerization. After 40 minutes, the rest of the monomer emulsion was uniformly added dropwise over 210 minutes with the reaction system being maintained at 80° C. Simultaneously therewith, 95 parts of a 5% aqueous solution of potassium persulfate and 90 parts of a 2% aqueous solution of sodium bisulfite were uniformly added dropwise over 210 minutes. After completion of the dropwise addition, the temperature was maintained for 60 minutes to complete the polymerization.

The resulting reaction solution was cooled to room temperature, and 16.7 parts of 2-dimethyl ethanolamine was added thereto. This gave an acrylic emulsion (resin composition 1-11) having a nonvolatile content of 55.1%, a pH of 8.5, a viscosity of 200 mPa·s, an average particle size of 190 nm, and a weight average molecular weight of 80000.

<Preparation of Coating>

Coatings were prepared according to the following formulation using each of the resin compositions 1-1 to 1-8 in Examples 1-1 to 1-8 and the resin compositions 1-9 to 1-11 in Comparative Examples 1-1 to 1-3. The properties were evaluated (the coat was subjected to evaluation of appearance and vibration damping test) as described below. Table 1 shows the results.
Each of resin compositions 1-1 to 1-11: 350 parts
Calcium carbonate NN#200[*1]: 700 parts
Dispersant AQUALIC DL-40S[*2]: 6 parts
Thickener ACRYSET WR-650[*3]: 4 parts *1: Filler produced by Nitto Funka Kogyo K.K. *2: Polycarboxylic acid-based dispersant (active component: 44%) produced by Nippon Shokubai Co., Ltd. *3: Alkali-soluble acrylic thickener (active component: 30%) produced by Nippon Shokubai Co., Ltd.

<Evaluation of Appearance of Coat>
(Evaluation of Degree of Preventing Blistering, Cracking, and/or Peeling of Coat)

Each coating was applied to a steel plate (trade name: SPCC-SD, 75 mm in width×150 mm in length×0.8 mm in thickness, Nippon Testpanel Co., Ltd.) so as to have a thickness of 4 mm. The applied coating was dried using a hot air dryer at 150° C. for 50 minutes. The surface condition of the resulting dry coat was evaluated based on the following criteria. The coating was foamed by heating using a hot air dryer.

(Evaluation Criteria)
Good: No defects were observed in the coat.
Average: Slight blisters and/or cracks were partially observed in the coat.
Fair: Blisters and/or cracks were partially observed in the coat.
Poor: Blisters, peeling, and/or cracks were observed throughout the coat.

(Evaluation of Thermal Softening Property of Coat on Vertical Surface)

The resulting coating was applied to a steel plate (ED steel plate) with dimensions of 0.8 mm×70 mm×150 mm electrodeposited using a cationic electrodeposition coating ELECRON "KG-400" (Kansai Paint Co., Ltd.) so as to have a wet film thickness of 4 mm. Immediately thereafter, the coated surface was made vertical and baked at 110° C. for 30 minutes. After completion of the baking, the test plate was taken out and the thicknesses of the upper end and lower end of the coated area were measured, and the thermal softening index was determined using the following equation. The thermal softening property was evaluated based on the following criteria.

(Calculation Equation of Thermal Softening Index)

$$\text{Thermal softening index} = (\text{Thickness of lower end (mm)})/(\text{Thickness of upper end (mm)})$$

(Evaluation Criteria)
Good: 2.5 or smaller
Fair: Greater than 2.5
Poor: The coat partially or entirely peeled away from the steel plate.

<Vibration Damping Test>

Each coating was applied to a cold rolled steel plate (trade name: SPCC, 15 mm in width×250 mm in length×1.5 mm in thickness, Nippon Testpanel Co., Ltd.) so as to have a thickness of 3 mm, and pre-dried at 80° C. for 30 minutes, followed by drying at 150° C. for 30 minutes. Thus, a vibration damping coat with a surface density of 4.0 kg/m$^2$ was formed on the cold rolled steel plate. The coating was foamed by heating in pre-drying and in drying after the pre-drying.

The vibration damping property was determined by evaluating the loss coefficients at particular temperatures (10° C., 20° C., 30° C., 40° C., 50° C., and 60° C.) by a cantilever method (loss coefficient measurement system, Ono Sokki Co., Ltd.). The vibration damping property was evaluated based on the total loss coefficient (the sum of loss coefficients at 10° C., 20° C., 30° C., 40° C., 50° C., and 60° C.). A larger total loss coefficient indicates a better vibration damping property.

TABLE 1

| | | | Example 1-1 | Example 1-2 | Example 1-3 | Example 1-4 | Example 1-5 | Example 1-6 |
|---|---|---|---|---|---|---|---|---|
| Core | Ingredients (20% aqueous solution of emulsifier prepared in advance) | HITENOL NF-08 | 135 | — | — | — | 144 | — |
| | | NEOPELEX G-65 | — | 135 | — | — | — | — |
| | | (i)-<1a> | — | — | 135 | 135 | — | 105 |
| | Ingredients (Monomers) | MMA | — | — | — | 125 | — | — |
| | | St | 450 | 450 | 450 | 380 | 460 | 350 |
| | | 2EHA | 316 | 316 | 316 | 286 | 326 | 256 |
| | | BA | 125 | 125 | 125 | 100 | 155 | 85 |
| | | AA | 9 | 9 | 9 | 9 | 9 | 9 |
| | | t-DM | 3 | 3 | 3 | 3 | 3 | 3 |
| | Tg (° C.) | | −5 | −5 | −5 | 5 | −8 | −5 |

TABLE 1-continued

| | | | | | | | | |
|---|---|---|---|---|---|---|---|---|
| Shell | Ingredients (20% aqueous solution of emulsifier prepared in advance) | HITENOL NF-08 | 15 | — | — | — | 6 | — |
| | | NEOPELEX G-65 | — | 15 | — | — | — | — |
| | | (i)-<1a> | — | — | 15 | 15 | — | 45 |
| | Ingredients (Monomers) | MMA | — | — | — | — | 38 | 295 |
| | | St | 70 | 70 | 65 | 88 | — | — |
| | | 2EHA | — | — | — | 12 | — | — |
| | | AA | — | — | — | — | — | 5 |
| | | IBMA | 30 | 30 | — | — | 12 | — |
| | | AAM | — | — | 35 | — | — | — |
| | | t-DM | 0.3 | 0.3 | 0.3 | 0.3 | 0.3 | 0.3 |
| | Tg (° C.) | | 120 | 120 | 120 | 66 | 120 | 105 |
| Whole | Proportion by mass of shell | | 10% | 10% | 10% | 10% | 5% | 30% |
| | Δ Tg (Tg of shell − Tg of core) (° C.) | | 125.0 | 125.0 | 125.0 | 61.0 | 128.0 | 110.0 |
| | Nonvolatile content (%) | | 55.0 | 55.0 | 55.1 | 55.0 | 55.0 | 54.8 |
| | pH | | 8.6 | 8.7 | 8.5 | 8.4 | 8.5 | 8.6 |
| | Viscosity (mPa · s) | | 250 | 280 | 200 | 230 | 290 | 320 |
| | Average particle size (nm) | | 180 | 150 | 200 | 190 | 170 | 160 |
| | Weight average molecular weight | | 70000 | 69000 | 75000 | 75000 | 72000 | 74000 |
| Results | Appearance | Thermal softening on vertical surface | Good | Good | Good | Good | Good | Good |
| | | Prevention degree of blistering, cracking, and/or peeling | Good | Fair | Good | Good | Good | Good |
| | Vibration damping property | 10° C. | 0.078 | 0.07 | 0.075 | 0.04 | 0.077 | 0.031 |
| | | 20° C. | 0.096 | 0.089 | 0.096 | 0.07 | 0.094 | 0.054 |
| | | 30° C. | 0.101 | 0.097 | 0.1 | 0.087 | 0.097 | 0.073 |
| | | 40° C. | 0.081 | 0.084 | 0.091 | 0.097 | 0.079 | 0.088 |
| | | 50° C. | 0.06 | 0.056 | 0.061 | 0.086 | 0.055 | 0.093 |
| | | 60° C. | 0.025 | 0.027 | 0.031 | 0.064 | 0.02 | 0.075 |
| | Vibration damping property (total) | | 0.441 | 0.423 | 0.454 | 0.444 | 0.422 | 0.414 |

| | | | Example 1-7 | Example 1-8 | Comparative Example 1-1 | Comparative Example 1-2 | Comparative Example 1-3 |
|---|---|---|---|---|---|---|---|
| Core | Ingredients (20% aqueous solution of emulsifier prepared in advance) | HITENOL NF-08 | 144 | — | 135 | — | — |
| | | NEOPELEX G-65 | — | — | — | 45 | 150 |
| | | (i)-<1a> | — | 135 | — | — | — |
| | Ingredients (Monomers) | MMA | — | — | 125 | — | — |
| | | St | 460 | 450 | 380 | 136 | 560 |
| | | 2EHA | 326 | 316 | 286 | 55 | 270 |
| | | BA | 155 | 125 | 100 | 100 | 150 |
| | | AA | 9 | 9 | 9 | 9 | 20 |
| | | t-DM | 3 | 3 | 3 | 1 | 3 |
| | Tg (° C.) | | −8 | −5 | 5 | −5 | 7 |
| Shell | Ingredients (20% aqueous solution of emulsifier prepared in advance) | HITENOL NF-08 | 6 | — | 15 | — | — |
| | | NEOPELEX G-65 | — | — | — | 105 | — |
| | | (i)-<1a> | — | 15 | — | — | — |
| | Ingredients (Monomers) | MMA | 47 | — | — | 650 | — |
| | | St | — | 92 | 84 | — | — |
| | | 2EHA | — | 8 | 16 | — | — |
| | | AA | — | — | — | — | — |
| | | IBMA | 3 | — | — | 50 | — |
| | | AAM | — | — | — | — | — |
| | | t-DM | 0.3 | 0.3 | 0.3 | 2 | — |
| | Tg (° C.) | | 86 | 77 | 56 | 110 | — |
| Whole | Proportion by mass of shell | | 5% | 10% | 10% | 70% | 0% |
| | Δ Tg (Tg of shell − Tg of core) (° C.) | | 94.0 | 82.0 | 51.0 | 115.0 | — |
| | Nonvolatile content (%) | | 55.0 | 55.0 | 55.0 | 55.1 | 55.1 |
| | pH | | 8.5 | 4.2 | 8.7 | 8.6 | 8.5 |
| | Viscosity (mPa · s) | | 290 | 220 | 190 | 170 | 200 |
| | Average particle size (nm) | | 170 | 230 | 200 | 250 | 190 |
| | Weight average molecular weight | | 72000 | 77000 | 71000 | 65000 | 80000 |
| Results | Appearance | Thermal softening on vertical surface | Good | Good | Poor | Good | Poor |
| | | Prevention degree of blistering, cracking, and/or peeling | Good | Good | Fair | Fair | Poor |
| | Vibration damping property | 10° C. | 0.059 | 0.075 | 0.039 | 0.016 | 0.055 |
| | | 20° C. | 0.088 | 0.096 | 0.063 | 0.024 | 0.082 |
| | | 30° C. | 0.095 | 0.099 | 0.085 | 0.042 | 0.097 |
| | | 40° C. | 0.078 | 0.081 | 0.093 | 0.063 | 0.081 |
| | | 50° C. | 0.061 | 0.053 | 0.074 | 0.077 | 0.052 |
| | | 60° C. | 0.036 | 0.027 | 0.045 | 0.089 | 0.03 |
| | Vibration damping property (total) | | 0.417 | 0.431 | 0.399 | 0.311 | 0.397 |

2. Examples of the Second Aspect of the Invention

The following describes the surfactants used in the below-described examples of the second aspect of the invention.

A polyoxyethylene alkyl ether-sulfosuccinate-disodium salt is a compound represented by the following formula (i):

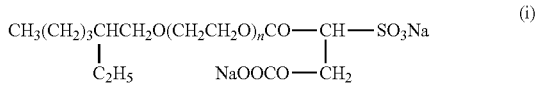

wherein n represents the average number of moles added. Herein, the compound in which n=8 is referred to as a compound (i)-<1>.

An N-alkyl monoamide disodium sulfosuccinate is a compound represented by the following formula (ii):

wherein R represents a C14-C20 alkyl group. Herein, the compound is also referred to as a compound (ii).

A polyoxyethylene alkyl ether-sulfosuccinic acid half ester salt is a compound represented by the following formula (iii):

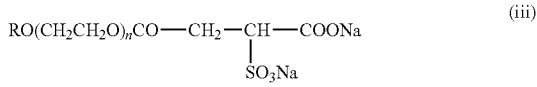

wherein R represents a C12-C14 secondary alkyl group.

In the formula, n represents the average number of moles added. Herein, the compound in which n=9 is referred to as a compound (iii)-<1>.

The following describes commercially available surfactants used in the examples and comparative examples.

NS soap (trade name, sodium soap of partially hydrogenated tallow fatty acid: Kao Corporation)

NEOPELEX G-65 (trade name, sodium dodecyl benzene sulfonate: Kao Corporation)

Example 2-1

A polymerization vessel equipped with a stirrer, a reflux condenser, a thermometer, a nitrogen inlet tube, and a dropping funnel was charged with 286.8 parts of deionized water. Then, the internal temperature was increased to 75° C. under stirring and nitrogen flow. Separately, the dropping funnel was charged with a monomer emulsion including 447 parts of methyl methacrylate, 135 parts of 2-ethylhexyl acrylate, 260 parts of butyl acrylate, 8.0 parts of acrylic acid, 2.0 parts of t-dodecyl mercaptan (also referred to as t-DM) serving as a polymerization chain transfer agent, 105.0 parts of a 20% aqueous solution of the compound (i)-<1>prepared in advance, and 213.0 parts of deionized water. Then, a 24.0-part portion of the monomer emulsion, 5 parts of a 5% aqueous solution of potassium persulfate serving as a polymerization initiator (oxidant), and 10 parts of a 2% aqueous solution of sodium bisulfite were added to the polymerization vessel with the internal temperature thereof being maintained at 75° C. to start initial polymerization. After 40 minutes, the rest of the monomer emulsion was uniformly added dropwise over 180 minutes with the reaction system being maintained at 80° C. Simultaneously therewith, 70 parts of a 5% aqueous solution of potassium persulfate and 70 parts of a 2% aqueous solution of sodium bisulfite were uniformly added dropwise over 180 minutes. After completion of the dropwise addition, the temperature was maintained for 60 minutes. This gave an aqueous dispersion of an acrylic copolymer having a glass transition temperature of 4° C. forming the core of an emulsion particle having a multilayer structure.

Then, the dropping funnel was charged with a monomer emulsion including 148 parts of methyl methacrylate and 2.0 parts of acrylic acid as monomers for forming the shell, 0.3 parts of t-DM, 20.0 parts of a 20% aqueous solution of the compound (i)-<1>prepared in advance, and 17.0 parts of deionized water. The monomer emulsion was uniformly added dropwise over 40 minutes to the aqueous acrylic copolymer dispersion prepared as described above. Simultaneously therewith, 25 parts of a 5% aqueous solution of potassium persulfate and 20 parts of a 2% aqueous solution of sodium bisulfite were uniformly added dropwise over 40 minutes. After completion of the dropwise addition, the temperature was maintained for 120 minutes to form the shell having a glass transition temperature of 105° C. The resulting reaction solution was cooled to room temperature, and 16.7 parts of 2-dimethyl ethanolamine was added thereto. This gave an acrylic emulsion (resin composition 2-1) having a nonvolatile content of 55.1%, a pH of 8.6, a viscosity of 200 mPa·s, an average particle size of 210 nm, and a weight average molecular weight of 125000.

Examples 2-2 to 2-6

Acrylic emulsions (resin compositions 2-2 to 2-6) were obtained as in Example 2-1, except that the ingredients added were changed as shown in Table 2 below.

Example 2-7

The core of an emulsion particle was produced as in Example 2-1, except that the ingredients of the monomer emulsion for forming the core of an emulsion particle in Example 2-1 were changed as follows: the amount of deionized water initially added to a polymerization vessel was changed from 286.8 parts to 290.9 parts, 447 parts of styrene was used instead of 447 parts of methyl methacrylate, and 30.0 parts of a 20% aqueous solution of the compound (iii)-<1>prepared in advance and 100.0 parts of NEOPELEX G-65 (Kao Corporation) were used instead of 105.0 parts of a 20% aqueous solution of the compound (i)-<1>prepared in advance. This gave an aqueous dispersion of an acrylic copolymer having a glass transition temperature of 3° C.

Then, the shell of an emulsion particle was produced as in Example 2-1, except that the ingredients of the monomer emulsion for forming the shell of an emulsion particle in Example 2-1 were changed as follows: 148 parts of styrene was used instead of 148 parts of methyl methacrylate, and 20.0 parts of a 20% aqueous solution of the compound (iii)-<1>prepared in advance was used instead of 20.0 parts of a 20% aqueous solution of the compound (i)-<1>prepared in advance. Thus, the shell having a glass transition temperature of 100° C. was obtained. Thereafter, the subsequent procedures were performed as in Example 2-1 to obtain an acrylic emulsion (resin composition 2-7) having a nonvolatile content of 55.0%, a pH of 8.6, a viscosity of 250 mPa·s, an average particle size of 170 nm, and a weight average molecular weight of 120000.

Reference Examples 2-1 and 2-2

Acrylic emulsions (resin compositions 2-8 and 2-9) were obtained as in Example 2-1, except that the ingredients added were changed as shown in Table 2 below.

Comparative Examples 2-1 and 2-2

Acrylic emulsions (resin compositions 2-10 and 2-11) were obtained as in Example 2-1, except that the ingredients added were changed as shown in Table 2 below.

<Preparation of Coating>

Coatings were prepared according to the following formulation using each of the resin compositions 2-1 to 2-11 in Examples 2-1 to 2-7, Reference Examples 2-1 and 2-2, and Comparative Examples 2-1 and 2-2. The properties were evaluated (the coat was subjected to evaluation of appearance and vibration damping test) as described below. Table 2 shows the results.

Each of resin compositions 2-1 to 2-11: 350 parts
Calcium carbonate NN#200*1: 700 parts
Dispersant AQUALIC DL-40S*2: 6 parts
Thickener ACRYSET WR-650*3: 4 parts *1: Filler produced by Nitto Funka Kogyo K.K. *2: Polycarboxylic acid-based dispersant (active component: 44%) produced by Nippon Shokubai Co., Ltd. *3: Alkali-soluble acrylic thickener (active component: 30%) produced by Nippon Shokubai Co., Ltd.

<Evaluation of Appearance of Coat>
(Evaluation of Degree of Preventing Blistering, Cracking, and/or Peeling of Coat)

Each coating was applied to a steel plate (trade name: SPCC-SD, 75 mm in width×150 mm in length×0.8 mm in thickness, Nippon Testpanel Co., Ltd.) so as to have a thickness of 4 mm. The applied coating was dried using a hot air dryer at 140° C. for 50 minutes. The surface condition of the resulting dry coat was evaluated based on the following criteria. The coating was foamed by heating using a hot air dryer.

(Evaluation Criteria)
Excellent: No defects were observed in the coat.
Good: Slight cracks were partially observed in the coat.
Fair: Blisters and/or cracks were partially observed in the coat.
Poor: Blisters, peeling, and/or cracks were observed throughout the coat.

(Evaluation of Thermal Softening Property of Coat on Vertical Surface)

The resulting coating was applied to a steel plate (Electro Deposition (ED) steel plate) with dimensions of 0.8 mm×70 mm×150 mm electrodeposited using a cationic electrodeposition coating Elecron "KG-400" (Kansai Paint Co., Ltd.) so as to have a wet film thickness of 4 mm. Immediately thereafter, the coated surface was made vertical and baked at 130° C. for 30 minutes. After completion of the baking, the test plate was taken out and the thicknesses of the upper end and lower end of the coated area were measured, and the thermal softening index was determined using the following equation. The thermal softening property was evaluated based on the following criteria.

(Calculation Equation of Thermal Softening Index)

Thermal softening index=(Thickness of lower end (mm))/(Thickness of upper end (mm))

(Evaluation Criteria)
Excellent: 1.0 or greater and 1.6 or smaller
Good: Greater than 1.6 and 2 or smaller
Fair: Greater than 2
Poor: The coat partially or entirely peeled away from the steel plate.

<Vibration Damping Test>

Each coating was applied to a cold rolled steel plate (trade name: SPCC, 15 mm in width×250 mm in length×1.5 mm in thickness, Nippon Testpanel Co., Ltd.) so as to have a thickness of 3.5 mm, and pre-dried at 80° C. for 30 minutes, followed by drying at 150° C. for 30 minutes. Thus, a vibration damping coat with a surface density of 4.0 kg/m² was formed on the cold rolled steel plate. The coating was foamed by heating in pre-drying and in drying after the pre-drying.

The vibration damping property was determined by evaluating the loss coefficients at particular temperatures (10° C., 20° C., 30° C., 40° C., 50° C., and 60° C.) by a cantilever method (loss coefficient measurement system, Ono Sokki Co., Ltd.). The vibration damping property was evaluated based on the total loss coefficient (the sum of loss coefficients at 10° C., 20° C., 30° C., 40° C., 50° C., and 60° C.). A larger total loss coefficient indicates a better vibration damping property.

TABLE 2

| | | | Example 2-1 | Example 2-2 | Example 2-3 | Example 2-4 | Example 2-5 | Example 2-6 |
|---|---|---|---|---|---|---|---|---|
| Core | Ingredients (20% aqueous solution of emulsifier prepared in advance) | (i)-<1> | 105 | — | — | — | — | — |
| | | (ii) | — | — | 105 | — | — | 105 |
| | | (iii)-<1> | — | 105 | — | — | 105 | — |
| | | NS soap | — | — | — | 105 | — | — |
| | | NEOPELEX G-65 | — | — | — | — | — | — |
| | Ingredients (Monomers) | MMA | 447 | — | — | — | — | — |
| | | St | — | 447 | 447 | 447 | 390 | 600 |
| | | 2EHA | 135 | 135 | 135 | 135 | 120 | 85 |
| | | BA | 260 | 260 | 260 | 260 | 332 | 163 |
| | | AA | 8 | 8 | 8 | 8 | 8 | 2 |
| | | t-DM | 2 | 2 | 2 | 2 | 2 | 2 |
| | Tg (° C.) | | 4 | 3 | 3 | 3 | −6 | 32 |
| Shell | Ingredients (20% aqueous solution of emulsifier prepared in advance) | (i)-<1> | 20 | — | — | — | — | — |
| | | (ii) | — | — | 20 | — | — | 20 |
| | | (iii)-<1> | — | 20 | — | — | 20 | — |
| | | NS soap | — | — | — | 20 | — | — |
| | | NEOPELEX G-65 | — | — | — | — | — | — |
| | Ingredients (Monomers) | MMA | 148 | — | — | — | — | — |
| | | St | — | 148 | 148 | 148 | 148 | 148 |
| | | 2EHA | — | — | — | — | — | — |
| | | BMA | — | — | — | — | — | — |
| | | AA | 2 | 2 | 2 | 2 | 2 | 2 |
| | | t-DM | 0.3 | 0.3 | 0.3 | 0.3 | 0.3 | 0.3 |
| | Tg (° C.) | | 105 | 100 | 100 | 100 | 100 | 100 |

TABLE 2-continued

| | | | | | | | | |
|---|---|---|---|---|---|---|---|---|
| Whole | Proportion by mass of shell | | 15% | 15% | 15% | 15% | 15% | 15% |
| | Δ Tg (Tg of shell − Tg of core) (° C.) | | 101.0 | 97.0 | 97.0 | 97.0 | 106.0 | 68.0 |
| | The total amount of component having sulfosuccinic acid (salt) structure and component having fatty acid (salt) structure in anionic surfactant | | 100% | 100% | 100% | 100% | 100% | 100% |
| | The total amount of component having sulfosuccinic acid (salt) structure and component having fatty acid (salt) structure in the entire monomer component used to produce emulsion | | 12.5% | 12.5% | 12.5% | 12.5% | 12.5% | 12.5% |
| | Nonvolatile content (%) | | 55.1 | 54.9 | 55.0 | 55.2 | 55.0 | 55.4 |
| | pH | | 8.6 | 8.5 | 8.2 | 8.7 | 8.5 | 8.5 |
| | Viscosity (mPa · s) | | 200 | 170 | 260 | 200 | 250 | 170 |
| | Average particle size (nm) | | 210 | 280 | 180 | 200 | 190 | 230 |
| | Weight average molecular weight | | 125000 | 110000 | 105000 | 120000 | 115000 | 115000 |
| Results | Appearance | Thermal softening on vertical surface | Excellent | Excellent | Excellent | Fair | Excellent | Good |
| | | Prevention degree of blistering, cracking, and/or peeling | Good | Excellent | Excellent | Good | Excellent | Excellent |
| | Vibration damping property | 10° C. | 0.08 | 0.085 | 0.079 | 0.07 | 0.096 | 0.04 |
| | | 20° C. | 0.096 | 0.097 | 0.091 | 0.088 | 0.103 | 0.051 |
| | | 30° C. | 0.101 | 0.103 | 0.099 | 0.095 | 0.098 | 0.065 |
| | | 40° C. | 0.089 | 0.093 | 0.092 | 0.087 | 0.078 | 0.077 |
| | | 50° C. | 0.065 | 0.069 | 0.074 | 0.069 | 0.059 | 0.09 |
| | | 60° C. | 0.031 | 0.036 | 0.045 | 0.042 | 0.02 | 0.098 |
| | Vibration damping property (total) | | 0.462 | 0.483 | 0.48 | 0.451 | 0.454 | 0.421 |

| | | | | Example 2-7 | Reference Example 2-1 | Reference Example 2-2 | Comparative Example 2-1 | Comparative Example 2-2 |
|---|---|---|---|---|---|---|---|---|
| | Core | Ingredients (20% aqueous solution of emulsifier prepared in advance) | (i)-<1> | — | 105 | 105 | — | — |
| | | | (ii) | — | — | — | — | — |
| | | | (iii)-<1> | 30 | — | — | — | 105 |
| | | | NS soap | — | — | — | — | — |
| | | | NEOPELEX G-65 | 100 | — | — | 105 | — |
| | | Ingredients (Monomers) | MMA | — | — | 664 | — | — |
| | | | St | 447 | 350 | 0 | 447 | 447 |
| | | | 2EHA | 135 | 332 | 48 | 135 | 135 |
| | | | BA | 260 | 160 | 130 | 260 | 260 |
| | | | AA | 8 | 8 | 8 | 8 | 8 |
| | | | t-DM | 2 | 2 | 2 | 2 | 2 |
| | | Tg (° C.) | | 3 | −18 | 52 | 3 | 3 |
| | Shell | Ingredients (20% aqueous solution of emulsifier prepared in advance) | (i)-<1> | — | 20 | 20 | — | — |
| | | | (ii) | — | — | — | — | — |
| | | | (iii)-<1> | 20 | — | — | — | 20 |
| | | | NS soap | — | — | — | — | — |
| | | | NEOPELEX G-65 | — | — | — | 20 | — |
| | | Ingredients (Monomers) | MMA | — | — | 148 | — | — |
| | | | St | 148 | 148 | — | 123 | — |
| | | | 2EHA | — | — | — | 25 | 13 |
| | | | BMA | — | — | — | — | 135 |
| | | | AA | 2 | 2 | 2 | 2 | 2 |
| | | | t-DM | 0.3 | 0.3 | 0.3 | 0.3 | 0.3 |
| | | Tg (° C.) | | 100 | 100 | 105 | 54 | 10 |
| | Whole | Proportion by mass of shell | | 15% | 15% | 15% | 15% | 15% |
| | | Δ Tg (Tg of shell − Tg of core) (° C.) | | 97.0 | 118.0 | 53.0 | 51.0 | 7.0 |
| | | The total amount of component having sulfosuccinic acid (salt) structure and component having fatty acid (salt) structure in anionic surfactant | | 33% | 100% | 100% | 0% | 100% |
| | | The total amount of component having sulfosuccinic acid (salt) structure and component having fatty acid (salt) structure in the entire monomer component used to produce emulsion | | 5.0% | 12.5% | 12.5% | 0.0% | 12.5% |
| | | Nonvolatile content (%) | | 55.0 | 54.8 | 55.0 | 55.1 | 55.4 |
| | | pH | | 8.6 | 8.4 | 8.5 | 8.7 | 8.4 |
| | | Viscosity (mPa · s) | | 250 | 200 | 190 | 210 | 220 |
| | | Average particle size (nm) | | 170 | 250 | 270 | 280 | 200 |
| | | Weight average molecular weight | | 120000 | 105000 | 110000 | 120000 | 10000 |

TABLE 2-continued

| Results | Appearance | Thermal softening on vertical surface | Excellent | Fair | Good | Poor | Poor |
|---|---|---|---|---|---|---|---|
| | | Prevention degree of blistering, cracking, and/or peeling | Fair | Fair | Fair | Fair | Good |
| | Vibration damping property | 10° C. | 0.073 | 0.089 | 0.026 | 0.061 | 0.081 |
| | | 20° C. | 0.09 | 0.079 | 0.034 | 0.079 | 0.094 |
| | | 30° C. | 0.092 | 0.06 | 0.046 | 0.088 | 0.099 |
| | | 40° C. | 0.079 | 0.049 | 0.055 | 0.074 | 0.086 |
| | | 50° C. | 0.065 | 0.038 | 0.069 | 0.052 | 0.059 |
| | | 60° C. | 0.049 | 0.025 | 0.078 | 0.041 | 0.03 |
| | Vibration damping property (total) | | 0.448 | 0.34 | 0.308 | 0.395 | 0.449 |

The invention claimed is:

1. A vibration damping coating comprising:
a vibration damping coating resin composition that contains an emulsion particle having a multilayer structure; and
a pigment,
the emulsion particle including an outermost layer and an inner layer located inside the outermost layer,
the inner layer being formed from a resin,
the outermost layer being formed from a resin having a glass transition temperature of 75° C. or higher,
the outermost layer being present in a proportion of 1% to 17% by mass in 100% by mass of the emulsion particle, and
wherein at least one of the resin forming the outer layer and the resin forming the inner layer comprises a (meth)acrylic polymer.

2. The vibration damping coating according to claim 1, wherein the glass transition temperature of the resin forming the outermost layer is higher than a glass transition temperature of the resin forming the inner layer by 30° C. or more.

3. The vibration damping coating according to claim 1, wherein the glass transition temperature of the resin forming the outermost layer is higher than a glass transition temperature of the resin forming the inner layer by 80° C. or more.

4. The vibration damping coating according to claim 1, wherein a glass transition temperature of the resin forming the inner layer is 30° C. to 40° C.

5. The vibration damping coating according to claim 1, wherein a glass transition temperature of the resin forming the inner layer is 15° C. or higher.

6. The vibration damping coating according to claim 1, wherein a glass transition temperature of the resin forming the inner layer is 10° C. or higher.

7. The vibration damping coating according to claim 1, wherein a glass transition temperature of the resin forming the inner layer is 35° C. or lower.

8. The vibration damping coating according to claim 1, wherein the composition further comprises a component having a sulfosuccinic acid structure or salt thereof and/or a component having a fatty acid structure or salt thereof.

9. The vibration damping coating according to claim 8, wherein the composition comprises a component having a sulfosuccinic acid structure or salt thereof.

10. The vibration damping coating according to claim 8, wherein a total amount of the component having a sulfosuccinic acid structure or salt thereof and the component having a fatty acid structure or salt thereof is 25% by mass or more in 100% by mass of an anionic surfactant in the composition.

11. The vibration damping coating according to claim 8, wherein the total amount of the component having a sulfosuccinic acid structure or salt thereof and the component having a fatty acid structure or salt thereof is 50% by mass or more in 100% by mass of the anionic surfactant in the composition.

12. The vibration damping coating according to claim 8, wherein the total amount of the component having a sulfosuccinic acid structure or salt thereof and the component having a fatty acid structure or salt thereof in the composition is 0.1% to 20% by mass relative to 100% by mass of the entire monomer component used to produce an emulsion.

13. The vibration damping coating according to claim 1, wherein the glass transition temperature of the resin forming the outermost layer is 80° C. or higher.

14. The vibration damping coating according to claim 8, wherein the glass transition temperature of the resin forming the outermost layer is 80° C. or higher.

15. The vibration damping coating according to claim 1, wherein at least one of the resin forming the outer layer and the resin forming the inner layer has a weight average molecular weight of 30000 to 400000.

16. The vibration damping coating according to claim 8, wherein at least one of the resin forming the outer layer and the resin forming the inner layer has a weight average molecular weight of 30000 to 400000.

17. A vibration damping coat obtained from the vibration damping coating according to claim 1.

18. A method for producing a vibration damping coating resin composition containing an emulsion particle having a multilayer structure, the method comprising:
polymerizing a monomer component to form a resin-containing inner layer; and
polymerizing a monomer component to produce the emulsion particle with an outermost layer formed from a resin having a glass transition temperature of 75° C. or higher and the outermost layer is present at a proportion of 1-17% by mass relative to 100% in the mass of the emulsion particle, wherein at least one of the resin forming the outer layer and the resin forming the inner layer comprises a (meth)acrylic polymer.

19. A vibration damping coating comprising:
a vibration damping coating resin composition that contains an emulsion particle having a multilayer structure; and
a pigment,
the emulsion particle including an outermost layer and an inner layer located inside the outermost layer,
the inner layer being formed from a resin, the outermost layer being formed from a resin having a glass transition temperature of 60° C. or higher, the outermost layer being present in a proportion of 1% to 17% by mass in 100% by mass of the emulsion particle, wherein a glass transition temperature of the resin forming the outermost layer is higher than a glass transition temperature of the resin forming the inner layer by 10° C. or more, and wherein at least one of the resin forming the outer layer and the resin forming the inner layer comprises a (meth)acrylic polymer.

20. A method for producing a vibration damping coating resin composition containing an emulsion particle having a multilayer structure, the method comprising:

polymerizing a monomer component to form a resin containing-inner layer; and polymerizing a monomer component to produce the emulsion particle with an outermost layer formed from a resin having a glass transition temperature of 60° C. or higher, and the outermost layer is present at a proportion of 1% to 17% by mass relative to 100% in the mass of the emulsion particle, wherein a glass transition temperature of a resin forming the outermost layer is higher than a glass transition temperature of the resin forming the inner layer by 10° C. or more, and wherein at least one of the resin forming the outer layer and the resin forming the inner layer comprises a (meth)acrylic polymer.

\* \* \* \* \*